(12) United States Patent
Paladugu et al.

(10) Patent No.: US 12,557,155 B2
(45) Date of Patent: Feb. 17, 2026

(54) DEVICE SELECTION PROCEDURES FOR IN VEHICLE NETWORK CONNECTIVITY

(71) Applicant: QUALCOMM Incorporated, San Diego, CA (US)

(72) Inventors: Karthika Paladugu, San Diego, CA (US); Hong Cheng, Basking Ridge, NJ (US); Soumya Das, San Diego, CA (US); Deviprasad Putchala, San Diego, CA (US); Francis Ming-Meng Ngai, Louisville, CO (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 17/947,726

(22) Filed: Sep. 19, 2022

(65) Prior Publication Data

US 2024/0098814 A1    Mar. 21, 2024

(51) Int. Cl.
*H04W 8/00* (2009.01)
*H04W 8/24* (2009.01)
*H04W 76/14* (2018.01)
*H04W 88/04* (2009.01)

(52) U.S. Cl.
CPC ............. *H04W 76/14* (2018.02); *H04W 8/24* (2013.01); *H04W 88/04* (2013.01)

(58) Field of Classification Search
CPC ....... H04W 76/14; H04W 8/24; H04W 88/04; H04W 48/16; H04W 92/18; H04W 8/005
See application file for complete search history.

(56) References Cited

U.S. PATENT DOCUMENTS

| | | | |
|---|---|---|---|
| 2009/0093280 A1* | 4/2009 | Kitazoe | H04W 76/27 455/574 |
| 2017/0094597 A1 | 3/2017 | Su et al. | |
| 2022/0086775 A1* | 3/2022 | Wang | H04W 56/0015 |

FOREIGN PATENT DOCUMENTS

| | | | |
|---|---|---|---|
| EP | 3525546 A1 | 8/2019 | |
| WO | WO-2022136387 A1 | 6/2022 | |

OTHER PUBLICATIONS

International Search Report and Written Opinion—PCT/US2023/030827—ISA/EPO—Dec. 12, 2023.

* cited by examiner

*Primary Examiner* — Joseph E Dean, Jr.
(74) *Attorney, Agent, or Firm* — Holland & Hart LLP

(57) ABSTRACT

Methods, systems, and devices for wireless communication are described. A first user equipment (UE) may receive link capability information from a second UE that has a cellular wireless connection with a network entity of a cellular wireless network. The link capability information may be associated with a subscription of the second UE to the cellular wireless network. The first UE may establish a local wireless connection with the second UE based on the link capability information associated with the subscription of the second UE to the cellular wireless network. The first UE may communicate one or more messages with the network entity of the cellular wireless network via the second UE using first subscriber identity module (SIM) credentials of the first UE or second SIM credentials of the second UE based on establishing the local wireless connection with the second UE.

28 Claims, 14 Drawing Sheets

DEVICE SELECTION PROCEDURES FOR IN VEHICLE NETWORK CONNECTIVITY

FIELD OF TECHNOLOGY

The following relates to wireless communication, including device selection procedures for in-vehicle network connectivity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a smartphone or a vehicle may be used as a relay device to support communications between a UE and a wireless communications network. In some examples, the smartphone or vehicle selected to be the relay device may suffer from low capability.

SUMMARY

The described techniques relate to improved methods, systems, devices, and apparatuses that support device selection procedures for in-vehicle network connectivity. More specifically, the described techniques provide for establishing a relay connection between a remote device and a relay device based on link capability information associated with one or both of the remote device or the relay device. In accordance with the described techniques, a first user equipment (UE) may receive, from a second UE (a relay device) that has a cellular wireless connection with a network entity of a cellular wireless network, link capability information associated with a subscription of the second UE to the cellular wireless network. Accordingly, the first UE (a remote device) may establish a local wireless connection with the second UE based on the link capability information. The first UE may communicate one or more messages with the network entity via the second UE using first subscriber identity module (SIM) credentials of the first UE or second SIM credentials of the second UE based on establishing the local wireless connection with the second UE.

A method for wireless communication at a first UE is described. The method may include receiving, from a second UE that has a cellular wireless connection with a network entity of a cellular wireless network, link capability information associated with a subscription of the second UE to the cellular wireless network. The method may further include establishing a local wireless connection with the second UE based on the link capability information associated with the subscription of the second UE to the cellular wireless network. The method may further include communicating one or more messages with the network entity of the cellular wireless network via the second UE using first SIM credentials of the first UE or second SIM credentials of the second UE based on establishing the local wireless connection with the second UE.

An apparatus for wireless communication at a first UE is described. The apparatus may include a processor, memory coupled with the processor, and instructions stored in the memory. The instructions may be executable by the processor to cause the apparatus to receive, from a second UE that has a cellular wireless connection with a network entity of a cellular wireless network, link capability information associated with a subscription of the second UE to the cellular wireless network. The instructions may be further executable by the processor to cause the apparatus to establish a local wireless connection with the second UE based on the link capability information associated with the subscription of the second UE to the cellular wireless network. The instructions may be further executable by the processor to cause the apparatus to communicate one or more messages with the network entity of the cellular wireless network via the second UE using first SIM credentials of the first UE or second SIM credentials of the second UE based on establishing the local wireless connection with the second UE.

Another apparatus for wireless communication at a first UE is described. The apparatus may include means for receiving, from a second UE that has a cellular wireless connection with a network entity of a cellular wireless network, link capability information associated with a subscription of the second UE to the cellular wireless network. The apparatus may further include means for establishing a local wireless connection with the second UE based on the link capability information associated with the subscription of the second UE to the cellular wireless network. The apparatus may further include means for communicating one or more messages with the network entity of the cellular wireless network via the second UE using first SIM credentials of the first UE or second SIM credentials of the second UE based on establishing the local wireless connection with the second UE.

A non-transitory computer-readable medium storing code for wireless communication at a first UE is described. The code may include instructions executable by a processor to receive, from a second UE that has a cellular wireless connection with a network entity of a cellular wireless network, link capability information associated with a subscription of the second UE to the cellular wireless network. The instructions may be further executable by the processor to establish a local wireless connection with the second UE based on the link capability information associated with the subscription of the second UE to the cellular wireless network. The instructions may be further executable by the processor to communicate one or more messages with the network entity of the cellular wireless network via the second UE using first SIM credentials of the first UE or second SIM credentials of the second UE based on establishing the local wireless connection with the second UE.

Some examples of the methods, apparatuses, and non-transitory computer-readable media described herein may further include operations, features, means, or instructions for exchanging link capability information with multiple UEs, including the second UE.

Some examples of the methods, apparatuses, and non-transitory computer-readable media described herein may further include operations, features, means, or instructions for selecting, from the multiple UEs, the second UE to relay communications between the first UE and the cellular wireless network based on the link capability information associated with the multiple UEs, including the link capability information associated with the second UE.

In some examples of the methods, apparatuses, and non-transitory computer-readable media described herein, receiving the link capability information may include operations, features, means, or instructions for receiving tethering capability information from the second UE via one or more discovery messages during a discovery process.

Some examples of the methods, apparatuses, and non-transitory computer-readable media described herein may further include operations, features, means, or instructions for performing a tethering setup process with the second UE based on selecting the second UE to relay communications between the first UE and the cellular wireless network, where establishing the local wireless connection with the second UE is based on the tethering setup process.

Some examples of the methods, apparatuses, and non-transitory computer-readable media described herein may further include operations, features, means, or instructions for transmitting one or more messages that indicate one or more device tethering capabilities, subscription capabilities, radio access technology (RAT) capabilities, antenna capabilities, power capabilities, local link capabilities, over-the-air (OTA) capabilities, or device loading capabilities of the first UE.

In some examples of the methods, apparatuses, and non-transitory computer-readable media described herein, receiving the link capability information may include operations, features, means, or instructions for receiving one or more messages that indicate one or more device tethering capabilities, subscription capabilities, RAT capabilities, antenna capabilities, power capabilities, local link capabilities, OTA capabilities, or device loading capabilities of the second UE.

Some examples of the methods, apparatuses, and non-transitory computer-readable media described herein may further include operations, features, means, or instructions for transmitting, via the local wireless connection, a request for cellular capability information associated with the second UE and receiving, via the local wireless connection, a response indicating the cellular capability information associated with the second UE.

Some examples of the methods, apparatuses, and non-transitory computer-readable media described herein may further include operations, features, means, or instructions for performing a relay device selection procedure based on the cellular capability information associated with the second UE, where communicating with the network entity of the cellular wireless network via the second UE is based on the relay device selection procedure.

Some examples of the methods, apparatuses, and non-transitory computer-readable media described herein may further include operations, features, means, or instructions for transmitting, via the local wireless connection, a request for RAT capability information associated with the second UE.

Some examples of the methods, apparatuses, and non-transitory computer-readable media described herein may further include operations, features, means, or instructions for receiving, via the local wireless connection, a response indicating the RAT capability information associated with the second UE.

Some examples of the methods, apparatuses, and non-transitory computer-readable media described herein may further include operations, features, means, or instructions for selecting the second UE to relay communications between the first UE and the cellular wireless network based on the RAT capability information associated with the second UE.

Some examples of the methods, apparatuses, and non-transitory computer-readable media described herein may further include operations, features, means, or instructions for selecting the second UE to relay communications between the first UE and the cellular wireless network based on obtaining full capability information for the second UE.

Some examples of the methods, apparatuses, and non-transitory computer-readable media described herein may further include operations, features, means, or instructions for switching from the local wireless connection with the second UE to a second local wireless connection with a different UE in response to a characteristic of the local wireless connection satisfying a path switching condition.

In some examples of the methods, apparatuses, and non-transitory computer-readable media described herein, receiving the link capability information may include operations, features, means, or instructions for receiving the link capability information from the second UE via a sidelink radio resource control (RRC) reconfiguration procedure, a RAT configuration management (CM) capability exchange procedure, or both.

Some examples of the methods, apparatuses, and non-transitory computer-readable media described herein may further include operations, features, means, or instructions for receiving an indication of an embedded SIM (eSIM) profile of the second UE via a SIM access profile exchange and transmitting a request to associate the eSIM profile of the second UE with a SIM subscription of the first UE, where communicating with the network entity of the cellular wireless network via the second UE is based on associating the eSIM profile of the second UE with the SIM subscription of the first UE.

In some examples of the methods, apparatuses, and non-transitory computer-readable media described herein, receiving the link capability information may include operations, features, means, or instructions for receiving SIM information from the second UE after selecting the second UE to relay communications between the first UE and the cellular wireless network, where the SIM information is received via a SIM access profile exchange.

Some examples of the methods, apparatuses, and non-transitory computer-readable media described herein may further include operations, features, means, or instructions for exchanging one or more RAT CM messages with the second UE via the local wireless connection, where the one or more RAT CM messages indicate an eSIM profile of the second UE.

In some examples of the methods, apparatuses, and non-transitory computer-readable media described herein, the local wireless connection between the first UE and the second UE includes a cellular sidelink connection, a Wi-Fi connection, a Bluetooth connection, a secured wireless connection, or a combination thereof.

A method for wireless communication at a second UE is described. The method may include transmitting, to a first UE, link capability information associated with a subscription of the second UE to a cellular wireless network, where the second UE has a cellular wireless connection with a network entity of the cellular wireless network. The method may further include establishing a local wireless connection with the first UE based on the link capability information associated with the subscription of the second UE to the cellular wireless network. The method may further include communicating one or more messages between the first UE and the network entity of the cellular wireless network using first SIM credentials of the first UE or second SIM credentials of the second UE based on establishing the local wireless connection with the first UE.

An apparatus for wireless communication at a second UE is described. The apparatus may include a processor, memory coupled with the processor, and instructions stored in the memory. The instructions may be executable by the processor to cause the apparatus to transmit, to a first UE, link capability information associated with a subscription of the second UE to a cellular wireless network, where the second UE has a cellular wireless connection with a network entity of the cellular wireless network. The instructions may be further executable by the processor to cause the apparatus to establish a local wireless connection with the first UE based on the link capability information associated with the subscription of the second UE to the cellular wireless network. The instructions may be further executable by the processor to cause the apparatus to communicate one or more messages between the first UE and the network entity of the cellular wireless network using first SIM credentials of the first UE or second SIM credentials of the second UE based on establishing the local wireless connection with the first UE.

Another apparatus for wireless communication at a second UE is described. The apparatus may include means for transmitting, to a first UE, link capability information associated with a subscription of the second UE to a cellular wireless network, where the second UE has a cellular wireless connection with a network entity of the cellular wireless network. The apparatus may further include means for establishing a local wireless connection with the first UE based on the link capability information associated with the subscription of the second UE to the cellular wireless network. The apparatus may further include means for communicating one or more messages between the first UE and the network entity of the cellular wireless network using first SIM credentials of the first UE or second SIM credentials of the second UE based on establishing the local wireless connection with the first UE.

A non-transitory computer-readable medium storing code for wireless communication at a second UE is described. The code may include instructions executable by a processor to transmit, to a first UE, link capability information associated with a subscription of the second UE to a cellular wireless network, where the second UE has a cellular wireless connection with a network entity of the cellular wireless network. The instructions may be further executable by the processor to establish a local wireless connection with the first UE based on the link capability information associated with the subscription of the second UE to the cellular wireless network. The instructions may be further executable by the processor to communicate one or more messages between the first UE and the network entity of the cellular wireless network using first SIM credentials of the first UE or second SIM credentials of the second UE based on establishing the local wireless connection with the first UE.

Some examples of the methods, apparatuses, and non-transitory computer-readable media described herein may further include operations, features, means, or instructions for selecting the first UE as a remote device for the second UE based on cellular connection capabilities associated with one or more SIMs of the first UE.

Some examples of the methods, apparatuses, and non-transitory computer-readable media described herein may further include operations, features, means, or instructions for transmitting, via the local wireless connection, a request for a SIM profile of the first UE and receiving an indication of the SIM profile of the first UE via a SIM access profile exchange.

Some examples of the methods, apparatuses, and non-transitory computer-readable media described herein may further include operations, features, means, or instructions for transmitting, via the local wireless connection, a request to initiate a SIM binding procedure with the cellular wireless network, where communicating the one or more messages between the first UE and the network entity of the cellular wireless network is based on the SIM binding procedure.

Some examples of the methods, apparatuses, and non-transitory computer-readable media described herein may further include operations, features, means, or instructions for transmitting an indication of an eSIM profile of the second UE via a SIM access profile exchange, where the eSIM profile of the second UE is used to perform the SIM binding procedure with the cellular wireless network.

Some examples of the methods, apparatuses, and non-transitory computer-readable media described herein may further include operations, features, means, or instructions for performing a RAT CM exchange procedure to transfer an eSIM profile of the second UE to the first UE, where the eSIM profile of the second UE is used to perform the SIM binding procedure with the cellular wireless network.

Some examples of the methods, apparatuses, and non-transitory computer-readable media described herein may further include operations, features, means, or instructions for exchanging SIM information with the first UE via a SIM access profile exchange.

Some examples of the methods, apparatuses, and non-transitory computer-readable media described herein may further include operations, features, means, or instructions for transmitting, via the local wireless connection, a request for a RAT CM device profile of the first UE.

Some examples of the methods, apparatuses, and non-transitory computer-readable media described herein may further include operations, features, means, or instructions for receiving, via the local wireless connection, an indication of the RAT CM device profile of the first UE.

Some examples of the methods, apparatuses, and non-transitory computer-readable media described herein may further include operations, features, means, or instructions for registering with the cellular wireless network using the SIM information provided by the first UE, the RAT CM device profile of the first UE, or both.

Some examples of the methods, apparatuses, and non-transitory computer-readable media described herein may further include operations, features, means, or instructions for establishing a relay connection between the first UE and the cellular wireless network based on the RAT CM device profile of the first UE.

Some examples of the methods, apparatuses, and non-transitory computer-readable media described herein may further include operations, features, means, or instructions for receiving one or more messages that indicate one or more device tethering capabilities, subscription capabilities, RAT capabilities, antenna capabilities, power capabilities, local link capabilities, OTA capabilities, or device loading capabilities of the first UE.

In some examples of the methods, apparatuses, and non-transitory computer-readable media described herein, transmitting the link capability information may include operations, features, means, or instructions for transmitting one or more messages that indicate one or more device tethering capabilities, subscription capabilities, RAT capabilities, antenna capabilities, power capabilities, local link capabilities, OTA capabilities, or device loading capabilities of the second UE.

Some examples of the methods, apparatuses, and non-transitory computer-readable media described herein may further include operations, features, means, or instructions for receiving, via the local wireless connection, a request for cellular capability information associated with the second UE.

Some examples of the methods, apparatuses, and non-transitory computer-readable media described herein may further include operations, features, means, or instructions for transmitting, via the local wireless connection, a response indicating the cellular capability information associated with the second UE.

DETAILED DESCRIPTION

Figure 1:
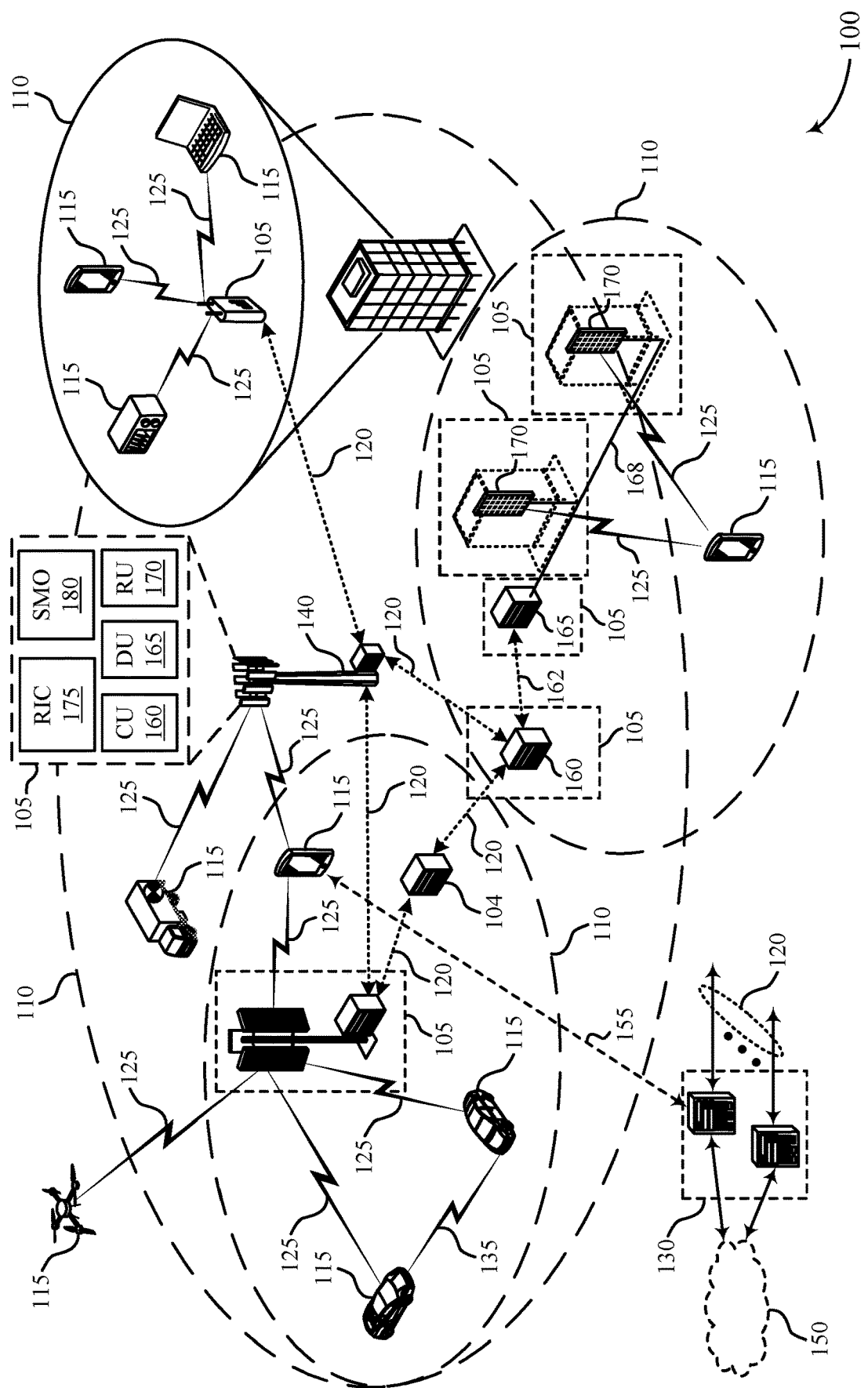
FIGS. 1 and 2 illustrate examples of wireless communications systems that support device selection procedures for in-vehicle network connectivity in accordance with one or more aspects of the present disclosure.

A wireless communications system may include various communication devices such as user equipments (UEs) and network entities. A UE may be equipped with a subscriber identity module (SIM) that is used for authentication and identity verification purposes. In some examples, such as dual SIM dual active (DSDA) and dual SIM dual standby (DSDS) deployments, a UE (which may be an example of a smartphone or a vehicle UE) may be equipped with two SIMs. As such, the UE may establish connectivity with two different wireless networks at the same time. These SIMS may be associated with different network operators, radio access technologies (RAT), data plans, etc. In some wireless communications systems that support in-vehicle network connectivity, a remote device (smartphone or vehicle) may communicate with a cellular wireless network via a relay device (vehicle or smartphone).

In some cases, the remote device may have access to or otherwise be connected with multiple candidate relay devices with different over-the-air (OTA) signaling capabilities, SIM plans, quality of service (QoS) criteria, etc. However, this capability information may be unavailable to the remote device. As such, the remote device may be unable to use this information for relay device selection. For example, the remote device may select a relay device without considering a link quality comparison between the multiple candidate relay devices. Accordingly, the vehicle connectivity experience (e.g., vehicle-as-relay, smartphone-as-relay) may suffer from lack of performance.

Aspects of the present disclosure support techniques for signaling relay device capability information to a remote device. For example, a relay device (referred to as a second UE) may signal various capabilities (supported RATs, power constraints, QoS criteria, SIM profile attributes) to a remote device (referred to as a first UE) during a Bluetooth SIM access profile (BT-SAP) exchange. If there are multiple UEs present, the remote device may request (or discover) capability information for each of the relay devices and use this information to choose a suitable relay device. After selecting one of the UEs as a relay, the remote device (which may be a smartphone or a vehicle) may provide the selected relay device with SIM credentials for the remote device such that the relay device can register with the network.

In some examples, the relay device (the second UE) and the remote device (the first UE) may perform a dynamic SIM binding procedure to establish connectivity with the network. For example, the remote device may transmit a request to associate SIM credentials of the remote device with the relay device such that the remote device can communicate with the network via the relay device. In some examples, the remote device may receive from the relay device tethering capability information via discovery messages in a discovery process. The remote device and the relay device may perform a tethering setup process that establishes a local wireless connection between the remote device and the relay device. In some examples, the remote device may perform a path switching decision by which the remote device may switch from the local wireless connection with the second UE to a second local wireless connection with a different UE. The path switching decision may be based on a characteristic of the local wireless connection.

Aspects of the present disclosure may be implemented to realize one or more of the following advantages. The described techniques may support improved in-vehicle connectivity by enabling a remote device to exchange link capability information (SIM profile information, cellular capability information) with one or more candidate relay devices. The remote device may use this link capability information to select a suitable relay device and communicate with a cellular wireless network via the selected relay device. Thus, rather than establishing a relay connection with a default communication device, the remote device may select a candidate relay device with compatible device attributes, which may improve the likelihood of successful communications between the remote device and the cellular wireless network.

Aspects of the disclosure are initially described in the context of wireless communications systems, device diagrams, and process flows. Aspects of the disclosure are further illustrated by and described with reference to apparatus diagrams, system diagrams, and flowcharts that relate to device selection procedures for in-vehicle network connectivity.

FIG. 1 illustrates an example of a wireless communications system 100 that supports device selection procedures for in-vehicle network connectivity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node.

In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130).

In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof.

An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack.

The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions.

A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)).

In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support device selection procedures for in-vehicle network connectivity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that enable devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with aspects of the present disclosure, a first UE 115 (e.g., a remote device) in the wireless communications system 100 may receive, from a second UE 115 (e.g., a relay device) that has a cellular wireless connection with a network entity 105 of a cellular wireless network, link capability information associated with a subscription of the second UE 115 to the cellular wireless network. The first UE 115 may establish a local wireless connection with the second UE 115 based on the link capability information associated with the subscription of the second UE 115 to the cellular wireless network. The first UE 115 may communicate, using first SIM credentials of the first UE 115 or second SIM credentials of the second UE 115, one or more messages with the network entity 105 of the cellular wireless network via the second UE 115 based on establishing the local wireless connection with the second UE 115.

Aspects of the wireless communications system 100 may be implemented to realize one or more of the following advantages. The techniques described with reference to FIG. 1 may support improved in-vehicle connectivity by enabling a remote device (a first UE 115) to exchange link capability information (SIM profile information, cellular capability information) with one or more candidate relay devices. The remote device may use this link capability information to select a suitable relay device (a second UE 115) and communicate with a cellular wireless network via the selected relay device. Thus, rather than establishing a relay connection with a default communication device, the remote device may select a candidate relay device with compatible device attributes, which may improve the likelihood of successful communications between the remote device and the cellular wireless network.

Figure 2:
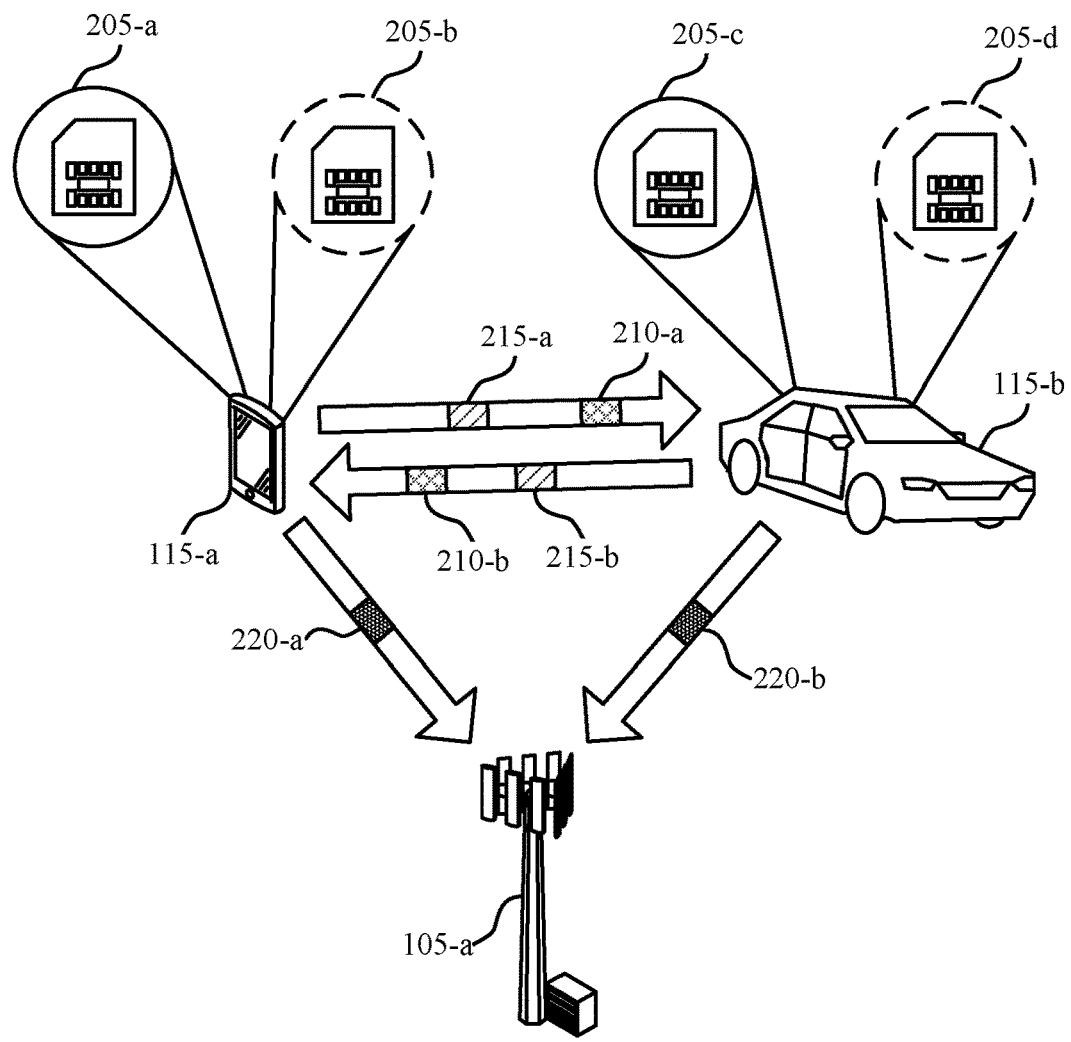

FIG. 2 illustrates an example of a wireless communications system 200 that supports device selection procedures for in-vehicle network connectivity in accordance with one or more aspects of the present disclosure. The wireless communications system 200 may implement or be implemented by aspects of wireless communications system 100. For example, the wireless communications system 200 may include a UE 115-*a* (a smartphone), a UE 115-*b* (a vehicle), and a network entity 105-*a*, which may be examples of corresponding devices described with reference to FIG. 1. Each of the UEs 115 may be equipped with one or more SIM cards, which may enable the UEs 115 to establish a cellular connection with the network entity 105-*a*. In the wireless communications system 200, the UE 115-*a* and the UE 115-*b* may exchange link capability information and SIM information via a local wireless connection.

In some examples, the UE 115-*a* may connect to the network entity 105-*a* directly via a Uu connection. The Uu connection may experience degraded performance (e.g., a 20 dB signal loss) due to metal windows of the vehicle. In other examples, the UE 115-*a* may connect to the wireless communications network via a vehicle Wi-Fi hotspot of the UE 115-*b*. The vehicle Wi-Fi hotspot connection may be a user-triggered switch. Accordingly, the vehicle Wi-Fi hotspot connection may be established without performing a link quality comparison. Some vehicle connectivity deployments may be unreliable. For example, a vehicle module may lack a Network Access Device (NAD), or the NAD may be for a phased out connectivity. In such examples, a vehicle Wi-Fi hotspot connection may be unsupported. Additionally, or alternatively, the vehicle Wi-Fi hotpot connection may experience degradation when the NAD is outdated or when the full capabilities of the NAD are not utilized.

In some examples, the UE 115-*a* may connect to the wireless communications network via the UE 115-*b*. For example, the UE 115-*a* may leverage the vehicle as a relay device when the vehicle NAD has suitable device capabilities. Additionally, or alternatively, the UE 115-*b* may connect to the wireless communication system via the UE 115-*a*. For example, the UE 115-*b* may leverage the smartphone as a relay device if the vehicle NAD has reduced capabilities. In still other examples, the vehicle Wi-Fi access point (AP) hotspot may connect to the wireless communications network via the UE 115-*a*. The UE 115-*a* may enable a personal IoT network with the vehicle Wi-Fi AP hotspot. Although described in the context of Wi-Fi, it is to be understood that the techniques described herein are also applicable to other wireless local access network (WLAN) deployments and RATs.

The UE 115-*b* may have a telematics original equipment manufacturer (OEM) SIM 205-*c* and the UE 115-*a* may have a primary SIM 205-*a*. In some examples, the UE 115-*a* may leverage the vehicle as a relay device. In some cases, the UE 115-*b* may have an embedded SIM (eSIM) 205-*d*. In other cases, the UE 115-*a* may have an eSIM 205-*b*, and the UE 115-*b* may obtain (e.g., via BT-SAP) the eSIM 205-*b* from the UE 115-*a*. The eSIM 205-*b* or the eSIM 205-*d* may be bundled with the primary SIM 205-*a* under a single subscription. In some examples, the UE 115-*b* may obtain (e.g., via BT-SAP) the primary SIM 205-*a* of the UE 115-*a*. In such examples, there may be no direct WLAN connection for the UE 115-*a*.

To support the relay connections described herein, the UE 115-*a* and the UE 115-*b* may exchange link capability information and SIM information. For example, the UE 115-*a* may transmit link capability information 210-*a* and SIM information 215-*a* to the UE 115-*b* via a local connection. Similarly, the UE 115-*b* may transmit link capability information 210-*b* and SIM information 215-*b* to the UE 115-*a* via the local connection. In some examples, when the UE 115-*a* leverages the vehicle as a relay device, the UE 115-*b* may utilize DSDS or DSDA. DSDS may enable resources to be fully used for an active connection (which may not be supported in a DSDA implementation), reduces cost and complexity in comparison to DSDA deployments, and may enable the UE 115-*a* to use a second connection for data transfer.

In some examples, the UE 115-*b* may leverage the smartphone as a relay device. The UE 115-*a* may share the primary SIM 205-*a* with the UE 115-*b*. In some examples, the UE 115-*a* may utilize (e.g., via BT-SAP) the telematics OEM SIM 205-*c* from the UE 115-*b*. In such examples, there may be no direct wireless access network (WAN) connection for the UE 115-*b*. The UE 115-*a* may obtain (e.g., via BT-SAP) the eSIM 205-*d* from the UE 115-*b*. The UE 115-*a* may use DSDS or DSDA when accessing the telematics OEM SIM 205-c or the eSIM 205-d.

In some examples, the UE 115-a may transmit a dynamic SIM binding request 220-a to the network entity 105-a. Likewise, the UE 115-b may transmit a dynamic SIM binding request 220-b to the network entity 105-a. In response to dynamic SIM binding request 220-a from the UE 115-a, the network entity 105-a may associate the eSIM 205-d of the UE 115-b (the vehicle or relay device) with a SIM subscription of the UE 115-a (the remote device). In response to the dynamic SIM binding request 220-b from the UE 115-b, the network entity 105-a may associate the eSIM 205-b of the UE 115-a (the relay device) with a SIM subscription of the UE 115-b (the remote device).

Figure 3:
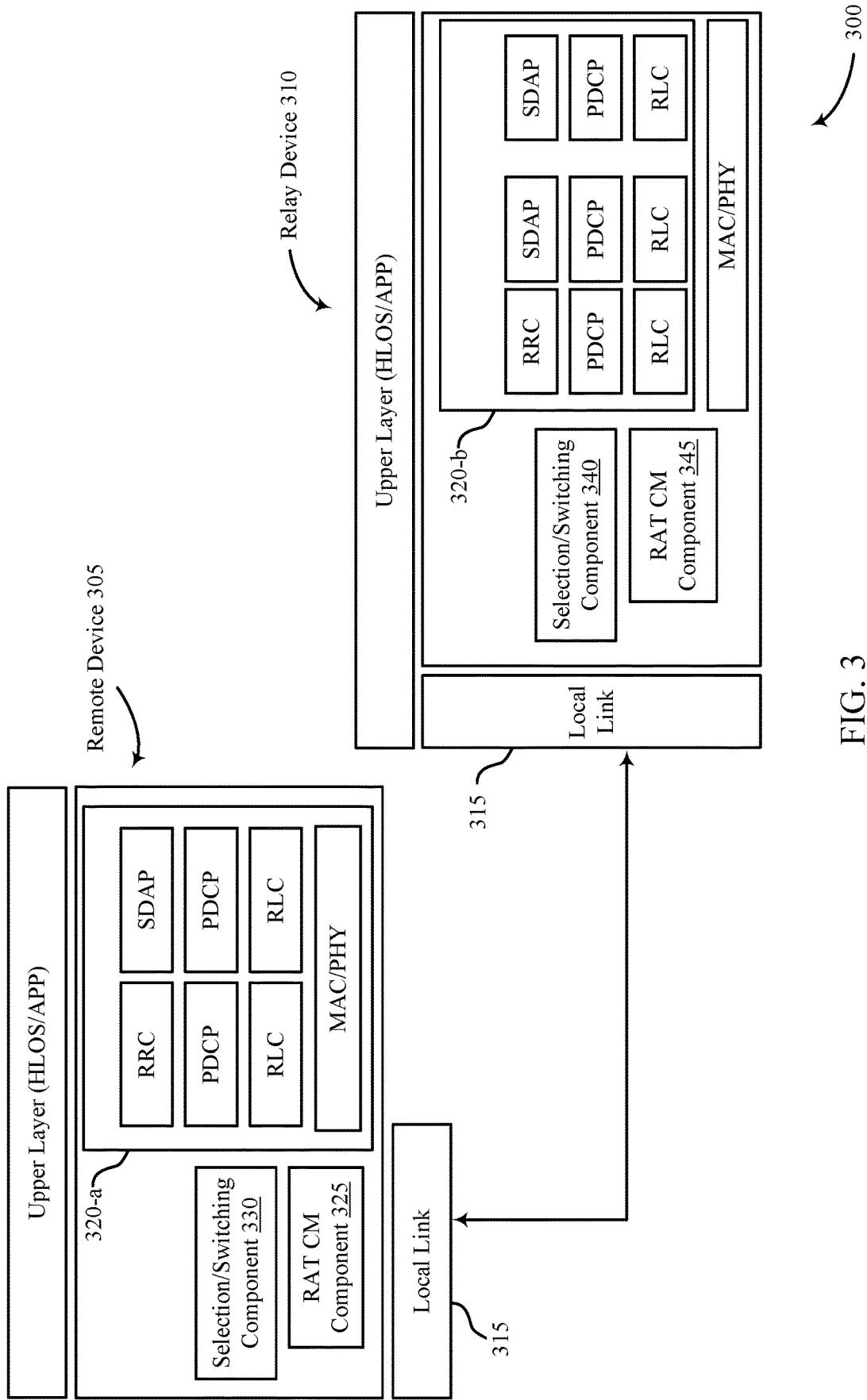
FIG. 3 illustrates an example of a device diagram that supports device selection procedures for in-vehicle network connectivity in accordance with one or more aspects of the present disclosure.

FIG. 3 illustrates an example of a device diagram 300 that supports device selection procedures for in-vehicle network connectivity in accordance with one or more aspects of the present disclosure. The device diagram 300 may implement or be implemented by aspects of the wireless communications system 100 or the wireless communications system 200. For example, the device diagram 300 may include a remote device 305 and a relay device 310, which may be examples of a UE 115 described with reference to FIGS. 1 and 2. The remote device 305 may establish a local link (also referred to as a local wireless connection) with the relay device 310 using a WLAN (such as Wi-Fi). In the device diagram 300, the remote device 305 may select the relay device 310 to relay communications from the remote device 305 to a wireless communications network. The remote device 305 may select the relay device 310 based on link capability information, cellular capability information, etc.

The device diagram 300 may illustrate an example of a short-term protocol stack. For example, the remote device 305 may utilize a protocol stack 320-a, and the relay device 310 may utilize a protocol stack 320-b. The protocol stacks utilized by the remote device 305 and the relay device 310 may include one or more RRC layers, PDCP layers, RLC layers, SDAP layers, PDCP layers, MAC or PHY layers, and upper layers such as a high-level operating system (HLOS) layer or an application (APP) layer. Some layers in the protocol stack 320-b be examples of user plane entities used for Wi-Fi tethering.

The remote device 305 may include a selection/switching component 330, while the relay device 310 may include a selection/switching component 340. The selection/switching component 330 may enable the remote device 305 to select a relay device (e.g., a smartphone or vehicle) or implement path switching. Likewise, the selection/switching component 340 may enable the relay device to select a remote device (e.g., a smartphone or vehicle) or implement path switching.

The remote device 305 may include a RAT configuration management (CM) component 325 (e.g., RAT CM client) and the relay device 310 may include a RAT CM component 345 (e.g., RAT CM configurator). The RAT CM component 325 and the RAT CM component 345 may be used for RAT configuration and mapping, protocol configuration (e.g., layer 2 protocols), configuration for clients, credential provisioning (e.g., for P2P connection), router configuration (e.g., for remote to local mapping), vehicle selection configuration, path switching configuration, or a combination thereof. Additionally, or alternatively, the RAT CM component 325 may support vehicle selection configuration, while the RAT CM component 345 may support smartphone selection configuration.

In some examples, the vehicle NAD capabilities may not be exchanged between the remote device 305 and the relay device 310. Accordingly, the smartphone may be unable to connect to the wireless communications network via the vehicle. For example, there the vehicle module may not have a NAD. Alternatively, the vehicle module may have an outdated or phased-out NAD. In some cases, the NAD may not support connectivity via a smartphone-as-relay deployment. To enable the vehicle selection, the remote device 305 may perform a capability exchange with the relay device 310.

In some examples, smartphone NAD capabilities may not be exchanged between the remote device 305 and the relay device 310. When there are multiple smartphones (e.g., driver smartphone, passenger smartphone) in the vehicle, the vehicle may connect to the smartphone with more favorable subscription capabilities (e.g., hotspot support, lower cost, same operator as a vehicle telematics SIM). In some examples, the vehicle may utilize static eSIM binding. For example, the eSIM or user SIM in the vehicle may be bound with the smartphone SIM statically (by the operator). In other cases, when a user is not present in the car or a different passenger in the car has a better subscription (e.g., a cost advantage), it may be beneficial to select a different smartphone and enable dynamic binding of the eSIM with the associated subscription.

In some examples, device profile information may not be signaled during a BT-SAP exchange. During 5G registration, an AMF may authenticate the UE by requesting a device ID of the UE. For example, the AMF may request the permanent equipment identifier (PEI) or the International Mobile Station Equipment Identity Software Version (IMEISV). Operators may have static associations between the international mobile station equipment identity (IMEI) of the device and the corresponding SIM credentials. For BT-SAP, which is used to exchange SIM profile information between devices, a lack of device profile information (e.g., IMEI, device ID) may result in registration failure of the relay device 310.

As described herein, the selection/switching component 330 and the selection/switching component 340 may exchange relay/remote device tethering capabilities. In some examples, the remote device 305 or the relay device 310 may perform a Wi-Fi hotspot AP selection based on respective cellular connection and local link tethering capabilities. The remote device 305 or the relay device 310 may communicate basic tethering capability information via one or more discovery messages. The basic tethering capability information may include subscription capabilities (e.g., QoS support for hotspot, data plan charges), modem RAT type (e.g., 3G, 4G, or 5G), a number of antennas supported, power information, local link capabilities (QoS support), or a combination thereof.

In some examples, the remote device 305 or the relay device 310 may communicate detailed cellular capabilities over a secure connection. The relay device 310 may transmit Uu capabilities for each RAT based on a request from the remote device 305. In some cases, the relay device 310 may advertise cellular capabilities (e.g., user eSIM capabilities). In such cases, the relay device 310 may advertise cellular capabilities via local link relay discovery messages. The local link relay discovery messages may include subscription capabilities, modem RAT type (e.g., 3G, 4G, 5G), number of antennas for OTA capabilities, power and loading information, or other basic information, or a combination thereof.

In some examples, the relay device 310 may establish a connection with the remote device 305 via a local access protocol 315 (e.g., Bluetooth, Wi-Fi). The relay device 310 may advertise cellular capabilities via secure signaling after the local link setup. The relay device may transmit an entire set of UE capabilities for each RAT based on a request from the remote device 305. In some examples, the remote device 305 and the relay device 310 may perform an RRC reconfiguration sidelink procedure. In some examples, the remote device 305 and the relay device 310 may use Wi-Fi or Bluetooth to perform a RAT CM capability exchange procedure.

Figure 4:
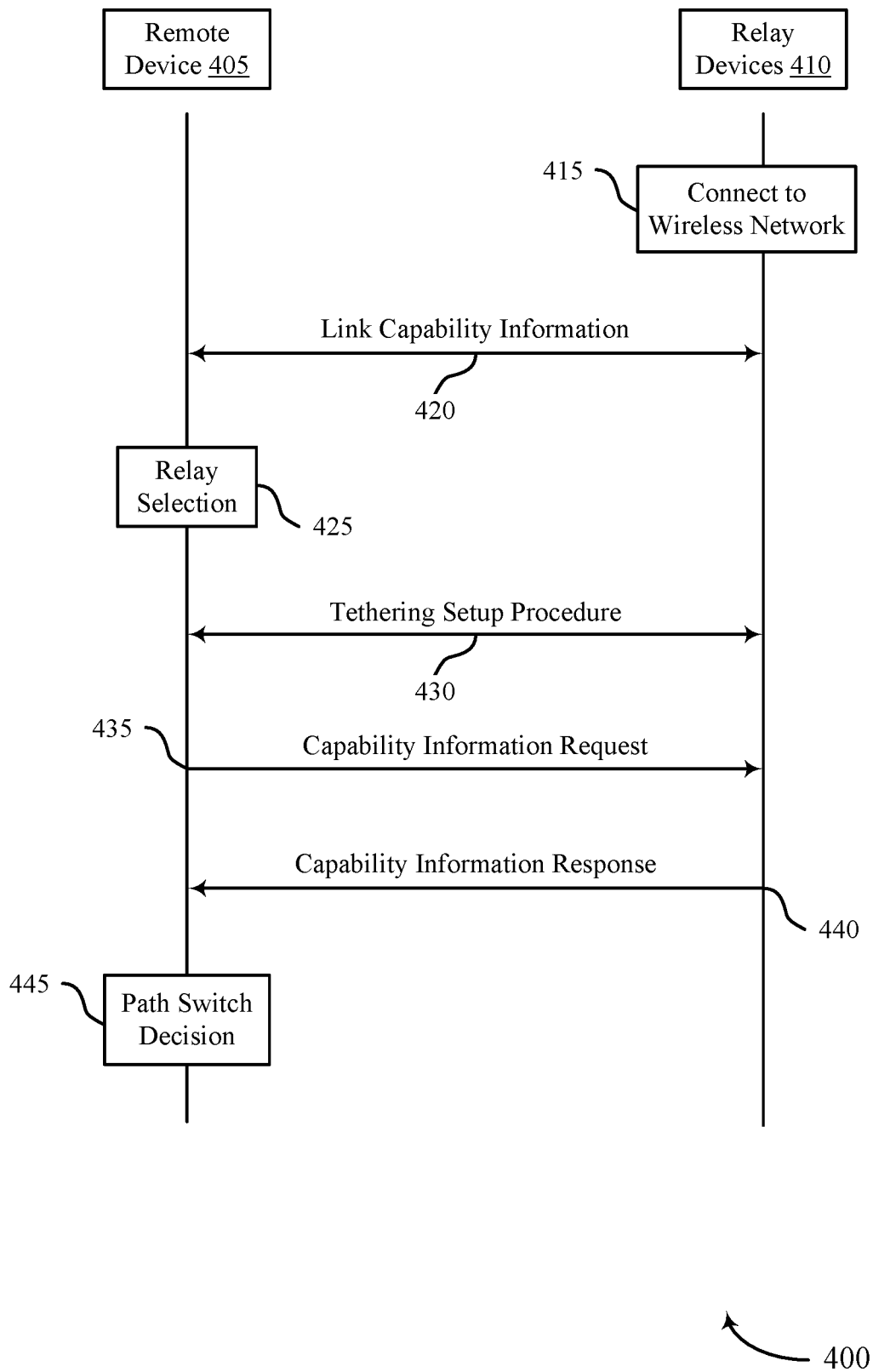
FIGS. 4 through 6 illustrate examples of process flows that support device selection procedures for in-vehicle network connectivity in accordance with one or more aspects of the present disclosure.

FIG. 4 illustrates an example of a process flow 400 that supports device selection procedures for in-vehicle network connectivity in accordance with one or more aspects of the present disclosure. The process flow 400 may implement or be implemented by aspects of any of the wireless communications systems or device diagrams described with reference to FIGS. 1 through 3. For example, the process flow 400 may include a remote device 405 and one or more relay devices 410, which may be examples of corresponding devices described with reference to FIGS. 1 through 3. In the following description of the process flow 400, operations between the remote device 405 and the one or more relay devices 410 may be added, omitted, or performed in a different order (with respect to the exemplary order shown).

At 415, the multiple relay devices 410 may establish a cellular wireless connection with a cellular wireless network (e.g., via a network entity).

At 420, the remote device 405 and the relay devices 410 may exchange link capability information. For example, the remote device 405 (e.g., a first UE) may receive from each of the relay devices 410 link capability information associated with a subscription of each relay device 410 to the cellular wireless network.

At 425, the remote device 405 may perform a relay device selection procedure. The remote device 405 may select, from the multiple relay devices, a relay device 410 (e.g., a second UE) to relay communications between the remote device and the cellular wireless network.

The remote device 405 may select a relay device from the multiple relay devices based on the link capability information associated with each relay device. The remote device may select a relay device for data connection from the multiple relay devices based on local link relay discovery selection criteria, subscription capability criteria, basic OTA capability criteria, device loading and power criteria, full capabilities of the relay device criteria, Uu OTA link quality, QoS criteria of the relay device, or a combination thereof. In some examples, the remote device 405 may determine that multiple relay devices are suitable for a local link based on the link capability information associated with each relay device. In such examples, the remote device 405 may establish a local link with multiple relay devices.

At 430, the remote device 405 and the selected relay devices 410 may perform a tethering setup process. The remote device 405 may establish a local wireless connection with each relay device based on the tethering setup process.

At 435, the remote device 405 may transmit, via the local wireless connection, a request to each relay device 410 for cellular capability information of each relay device 410.

At 440, the relay devices 410 may each transmit (to the remote device 405) a response indicating the cellular capability information of each relay device 410. Accordingly, the remote device may filter the relay devices based on obtaining the cellular capability information or full capability information of each of the relay devices.

At 445, the remote device 405 may monitor the relay device 410 for path switch criteria. In some examples, the remote device 405 may switch from the local wireless data connection with a first relay device 410 to a second local wireless data connection with a second relay device 410 in response to a characteristic of the local wireless data connection satisfying a path switching condition. In such examples, the local wireless data connection to the second relay device 410 may be suitable for path switching.

Figure 5:
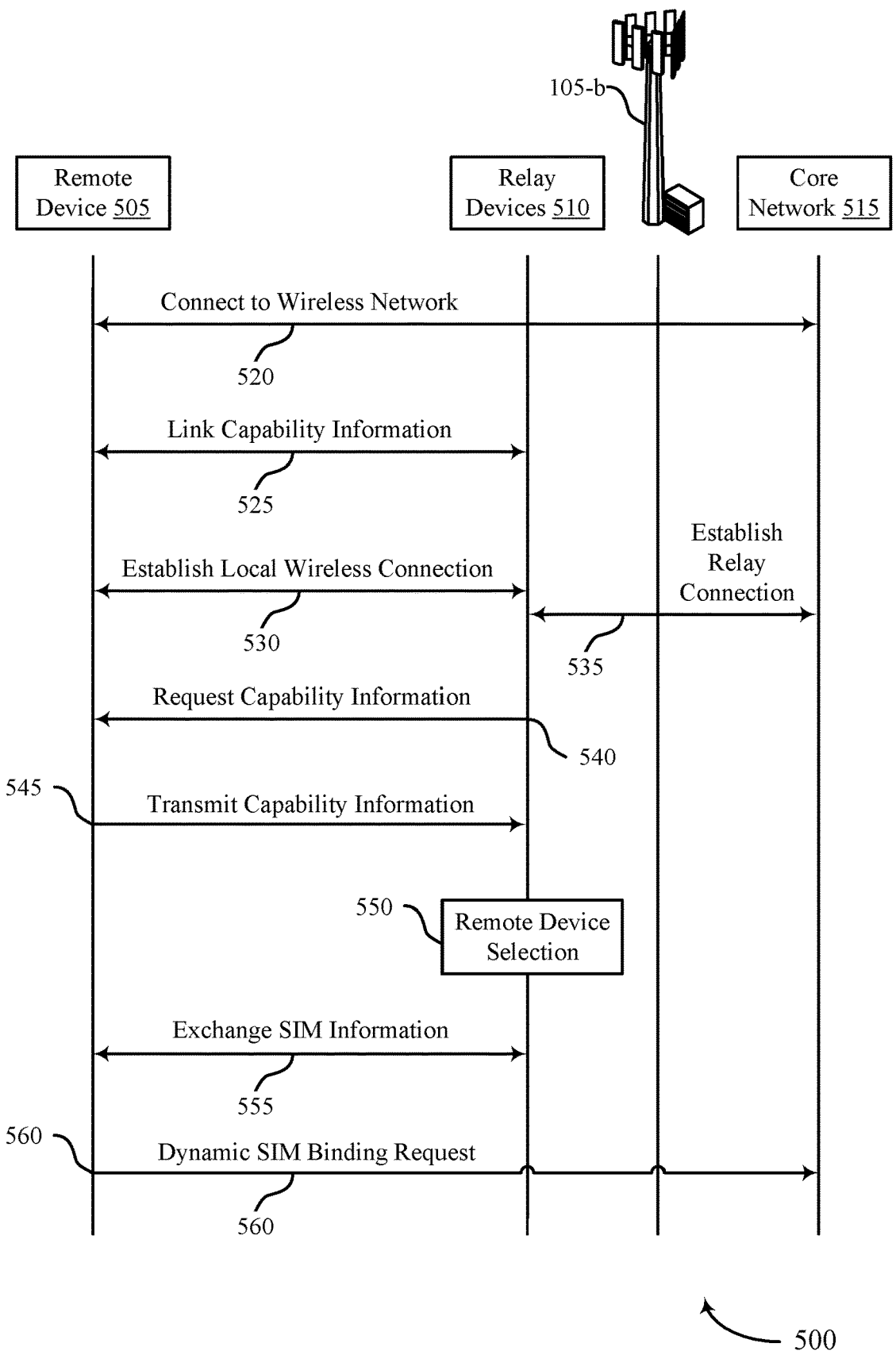

FIG. 5 illustrates an example of a process flow 500 that supports device selection procedures for in-vehicle network connectivity in accordance with one or more aspects of the present disclosure. The process flow 500 may implement or be implemented by aspects of any of the wireless communications systems, device diagrams, or process flows described with reference to FIGS. 1 through 4. For example, the process flow 500 may include a remote device 505, one or more relay devices 510, a network entity 105-b, and a core network 515, which may be examples of corresponding devices described with reference to FIGS. 1 through 4. In the following description of the process flow 500, operations between the remote device 505, the one or more relay devices 510, the network entity 105-b, and the core network 515 may be added, omitted, or performed in a different order (with respect to the exemplary order shown).

At 520, the remote device 505, the relay device 510, and the network entity 105-b may establish a cellular wireless network with the core network 515. For example, the relay device 510 or the remote device 505 may establish a connection with the network entity 105-b which may establish a connection with the core network 515.

At 525, the remote device 505 and the relay device 510 may exchange link capability information. For example, the remote device 505 (e.g., a first UE) may receive from the relay device 410 (e.g., a second UE) link capability information associated with a subscription of the relay device 410 to the core network 515.

As described herein with reference to FIGS. 1 through 4, the link capability information may be transmitted via a sidelink RRC reconfiguration procedure, a RAT CM capability exchange procedure, or both. The local link capability information may include device tethering capabilities, subscription capabilities, RAT capabilities, antenna capabilities, power capabilities, local link capabilities, OTA capabilities, device loading capabilities, or a combination thereof.

At 530, the remote device may establish a local wireless connection with the relay device based on the link capability information associated with a subscription of the relay device 410 to the core network 515. The local wireless connection may include a cellular sidelink connection, a Wi-Fi connection (or any WLAN connection), a Bluetooth connection, a secured wireless connection, or a combination thereof.

At 535, the relay device 510 may establish a relay connection with the core network 515.

At 540, the relay device 510 may transmit, via the local wireless connection, a request (e.g., a discover message) to the remote device 505 for capability information. The request may include a request for cellular capability information, RAT capability information, full capability information, or a combination thereof. In some examples, the request may include a request for cellular connection capabilities associated with one or more SIMS of the remote device 505.

At 545, the remote device 505 may transmit the requested capability information. For example, the remote device 505 may transmit the cellular capability information of the remote device 505, the RAT capability information of the remote device 505, the full capability information of the remote device 505, or a combination thereof. The remote device 505 may transmit the cellular connection capabilities associated with one or more SIMs of the remote device 505.

At 550, the relay device 510 may select the remote device 505 as a suitable remote device for the relay device 510 based on the cellular connection capabilities associated with one or more SIMs of the remote device 505.

At 555, the relay device 510 and the remote device 505 may exchange SIM information. For example, the relay device 510 may request a user eSIM profile of the remote device 505 via BT-SAP if there is no user eSIM on the relay device 510. The remote device 505 may transfer the user eSIM profile of the remote device 505 to the relay device 510 via BT-SAP. In some examples, the remote device 505 may transfer the eSIM profile of the remote device 505 to the relay device 510 via a SIM access profile exchange or a RAT CM exchange procedure. The SIM access profile exchange or the RAT CM exchange procedure may further be used to bind the user eSIM of the remote device 505 to the relay device 510 using a SIM subscription of the remote device 505. In some examples, the relay device 510 may request the remote device 505 to initiate a SIM binding procedure (e.g., dynamic binding) with the core network 515 using the user eSIM profile of the remote device 505.

At 560, the remote device 505 may transmit, via the local wireless connection (e.g., via 5GC signaling), a request to the core network 515 to initiate a SIM binding procedure (e.g., dynamic binding) with the core network 515. The user eSIM profile of the remote device 505 may be used to perform the SIM binding procedure with the core network 515. In some examples, the relay device 510 may communicate one or more messages between the remote device 505 and the network entity 105-b based on the SIM binding procedure.

Figure 6:
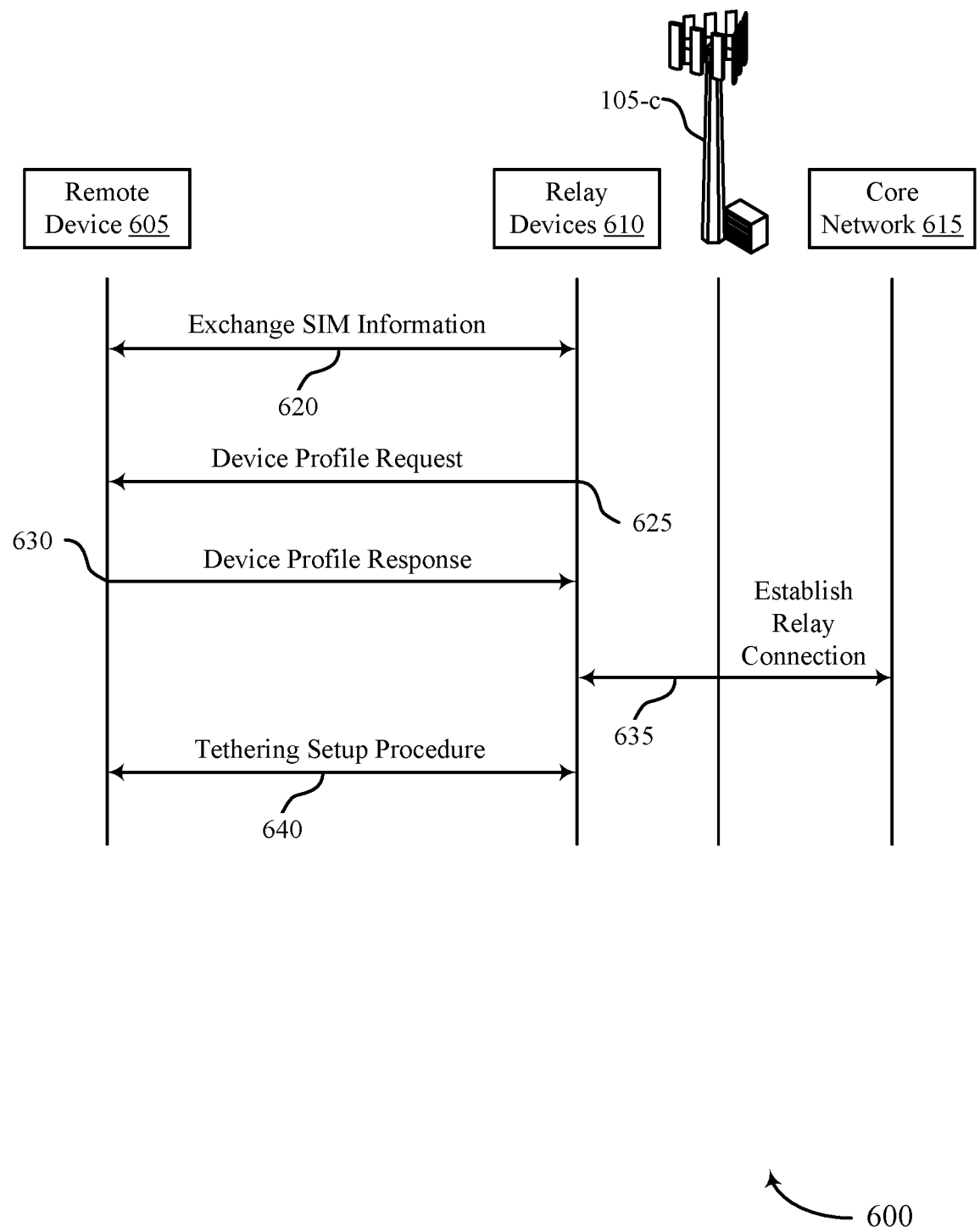

FIG. 6 illustrates an example of a process flow 600 that supports device selection procedures for in-vehicle network connectivity in accordance with one or more aspects of the present disclosure. The process flow 600 may implement or be implemented by aspects of any of the wireless communications systems, device diagrams, or process flows described with reference to FIGS. 1 through 5. For example, the process flow 600 may include a remote device 605, one or more relay devices 610, a network entity 105-c, and a core network 615, which may be examples of corresponding devices described with reference to FIGS. 1 through 5. In the following description of the process flow 600, operations between the remote device 605, the one or more relay devices 610, the network entity 105-c, and the core network 615 may be added, omitted, or performed in a different order (with respect to the exemplary order shown).

In accordance with the techniques described herein, a remote device 605 in a wireless communications system may receive, from one or more relay devices 610 that have a cellular wireless connection with a network entity 105-c of a cellular wireless network, link capability information associated with a subscription of the relay devices 610 to the core network 615. The remote device 605 may establish a local wireless connection with one of the relay devices 610 based on the link capability information. The remote device 605 may communicate one or more messages with the core network 615 via the network entity 105-c and the relay device 610 using first SIM credentials of the remote device 605 or second SIM credentials of the relay device 610 based on establishing the local wireless connection with one of the relay devices 610.

At 620, the remote device 605 and the relay device 610 may exchange SIM information (e.g., via BT-SAP).

At 625, the relay device 610 may request a SIM profile of the remote device 605. In some examples, the request may occur when SIM credentials are exchanged between the remote device 605 and the relay device 610 via BT-SAP.

At 630, the remote device may transmit a response to the device profile request. For example, the remote device 605 may transmit the SIM profile of the remote device 605 via a SIM access profile exchange (e.g., via RAT CM messages over BT).

At 635, the relay device 610 may establish a relay connection with the core network 615 based on obtaining the SIM profile of the remote device 605. For example, the relay device 610 may register with the core network 615 using the SIM profile and device profile information of the remote device 605.

At 640, the remote device 605 and the relay device 610 may perform a tethering setup process. The tethering setup process may be based on selecting the relay device 610 to relay communications between the remote device 605 and the core network 615 (e.g., via the network entity 105-c). The remote device 605 and the relay device 610 may use the tethering setup process to establish a local wireless connection.

Aspects of the process flow 600 may be implemented to realize one or more of the following advantages. The techniques described with reference to FIG. 6 may support improved in-vehicle connectivity by enabling the remote device 605 to exchange link capability information (SIM profile information, cellular capability information) with the relay devices 610. The remote device 605 may use this link capability information to select one of the relay devices 610 and communicate with one or both of the network entity 105-c or the core network 615 via the selected relay device. Thus, rather than establishing a relay connection with a default communication device, the remote device 605 may select a candidate relay device with compatible device attributes, which may improve the likelihood of successful communications between the remote device 605 and one or both of the network entity 105-c or the core network 615.

Figure 7:
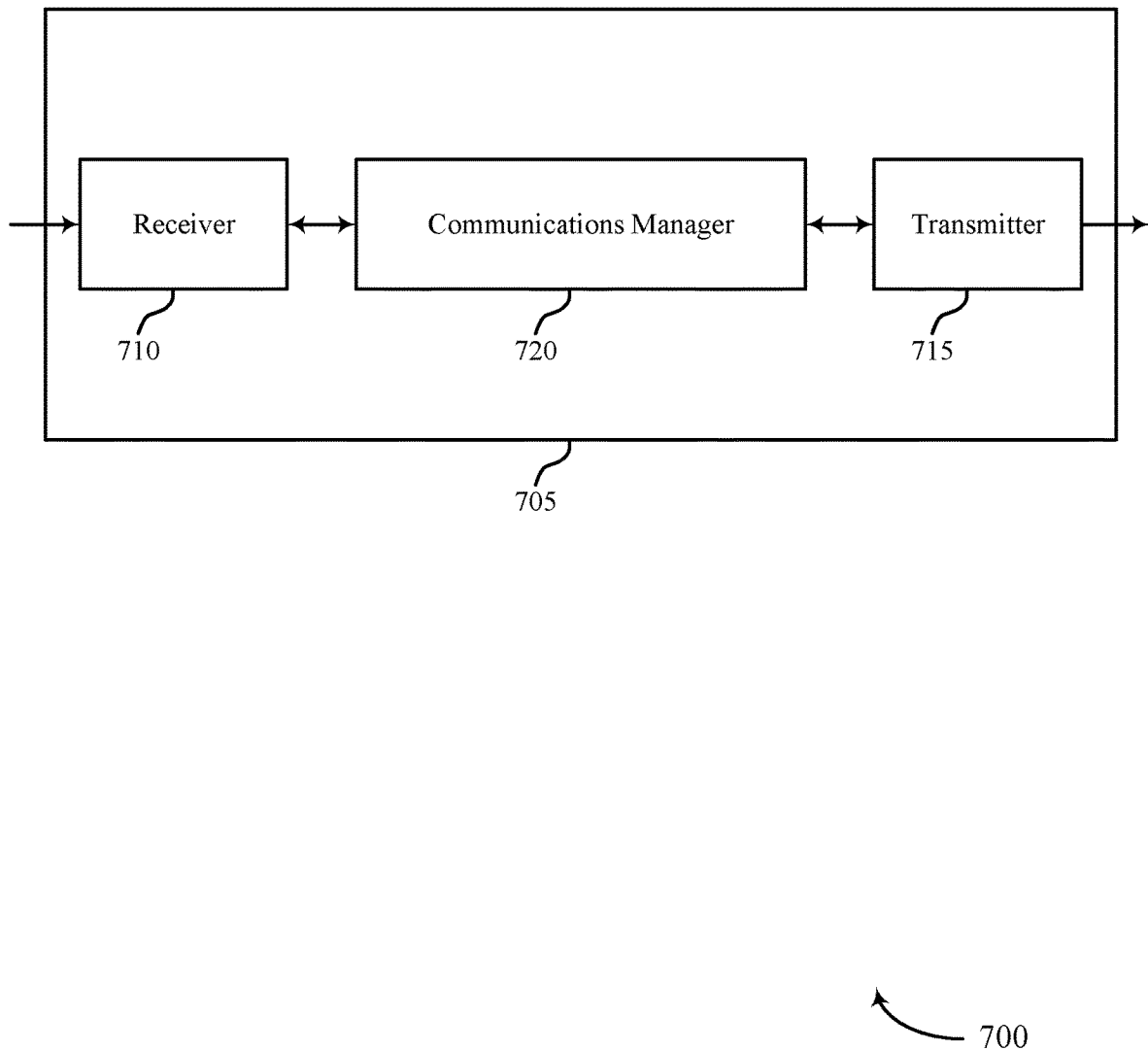
FIGS. 7 and 8 show block diagrams of devices that support device selection procedures for in-vehicle network connectivity in accordance with one or more aspects of the present disclosure.

FIG. 7 shows a block diagram 700 of a device 705 that supports device selection procedures for in-vehicle network connectivity in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to device selection procedures for in-vehicle network connectivity). Information may be passed on to other components of the device 705. The receiver 710 may utilize a single antenna or a multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to device selection procedures for in-vehicle network connectivity). In some examples, the transmitter 715 may be co-located with a receiver 710 in a transceiver module. The transmitter 715 may utilize a single antenna or a multiple antennas.

The communications manager 720, the receiver 710, the transmitter 715, or various combinations thereof or various components thereof may be examples of means for performing various aspects of device selection procedures for in-vehicle network connectivity as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples disclosed herein. For example, the communications manager 720 may be configured as or otherwise support a means for receiving, from a second UE that has a cellular wireless connection with a network entity of a cellular wireless network, link capability information associated with a subscription of the second UE to the cellular wireless network. The communications manager 720 may be configured as or otherwise support a means for establishing a local wireless connection with the second UE based on the link capability information associated with the subscription of the second UE to the cellular wireless network. The communications manager 720 may be configured as or otherwise support a means for communicating one or more messages with the network entity of the cellular wireless network via the second UE using first SIM credentials of the first UE or second SIM credentials of the second UE based on establishing the local wireless connection with the second UE.

Additionally, or alternatively, the communications manager 720 may support wireless communication at a second UE in accordance with examples disclosed herein. For example, the communications manager 720 may be configured as or otherwise support a means for transmitting, to a first UE, link capability information associated with a subscription of the second UE to a cellular wireless network, the second UE having a cellular wireless connection with a network entity of the cellular wireless network. The communications manager 720 may be configured as or otherwise support a means for establishing a local wireless connection with the first UE based on the link capability information associated with the subscription of the second UE to the cellular wireless network. The communications manager 720 may be configured as or otherwise support a means for communicating one or more messages between the first UE and the network entity of the cellular wireless network using first SIM credentials of the first UE or second SIM credentials of the second UE based on establishing the local wireless connection with the first UE.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced power consumption by enabling the device 705 to select a relay device and communicate with a cellular wireless network via the selected relay device. The device 705 may select the relay device based on link capability information associated with the relay device, cellular capability information associated with the relay device, etc. By using capability information to select a relay device, the device 705 may have a greater likelihood of successfully communicating with the cellular wireless network via a relay device, which may reduce the number of retransmissions performed by the device 705 (thereby resulting in decreased power consumption at the device 705).

Figure 8:
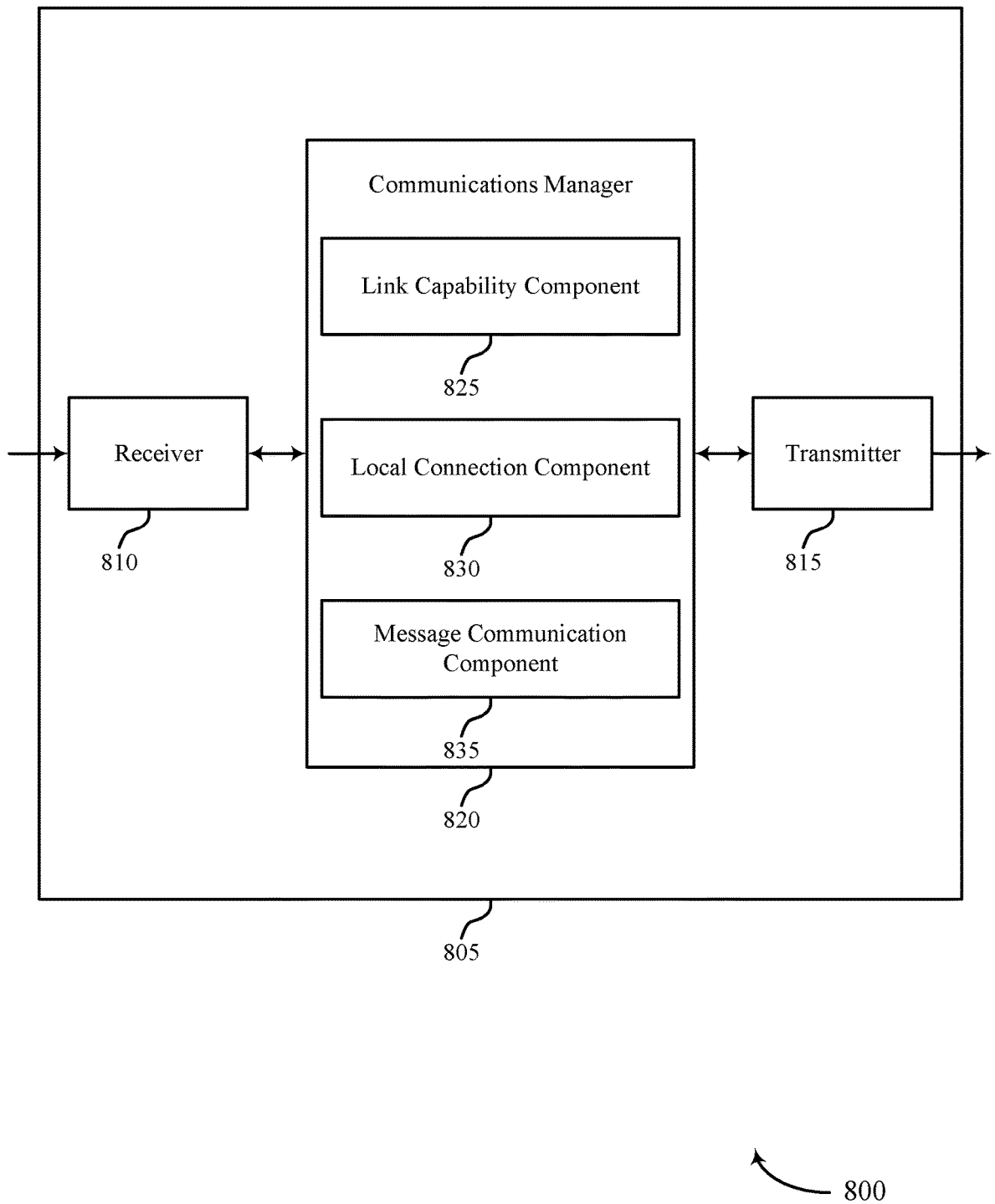

FIG. 8 shows a block diagram 800 of a device 805 that supports device selection procedures for in-vehicle network connectivity in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to device selection procedures for in-vehicle network connectivity). Information may be passed on to other components of the device 805. The receiver 810 may utilize a single antenna or a multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to device selection procedures for in-vehicle network connectivity). In some examples, the transmitter 815 may be co-located with a receiver 810 in a transceiver module. The transmitter 815 may utilize a single antenna or a multiple antennas.

The device 805, or various components thereof, may be an example of means for performing various aspects of device selection procedures for in-vehicle network connectivity as described herein. For example, the communications manager 820 may include a link capability component 825, a local connection component 830, a message communication component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples disclosed herein. The link capability component 825 may be configured as or otherwise support a means for receiving, from a second UE that has a cellular wireless connection with a network entity of a cellular wireless network, link capability information associated with a subscription of the second UE to the cellular wireless network. The local connection component 830 may be configured as or otherwise support a means for establishing a local wireless connection with the second UE based on the link capability information associated with the subscription of the second UE to the cellular wireless network. The message communication component 835 may be configured as or otherwise support a means for communicating one or more messages with the network entity of the cellular wireless network via the second UE using first SIM credentials of the first UE or second SIM credentials of the second UE based on establishing the local wireless connection with the second UE.

Additionally, or alternatively, the communications manager 820 may support wireless communication at a second UE in accordance with examples disclosed herein. The link capability component 825 may be configured as or otherwise support a means for transmitting, to a first UE, link capability information associated with a subscription of the second UE to a cellular wireless network, the second UE having a cellular wireless connection with a network entity of the cellular wireless network. The local connection component 830 may be configured as or otherwise support a means for establishing a local wireless connection with the first UE based on the link capability information associated with the subscription of the second UE to the cellular wireless network. The message communication component 835 may be configured as or otherwise support a means for communicating one or more messages between the first UE and the network entity of the cellular wireless network using first SIM credentials of the first UE or second SIM credentials of the second UE based on establishing the local wireless connection with the first UE.

Figure 9:
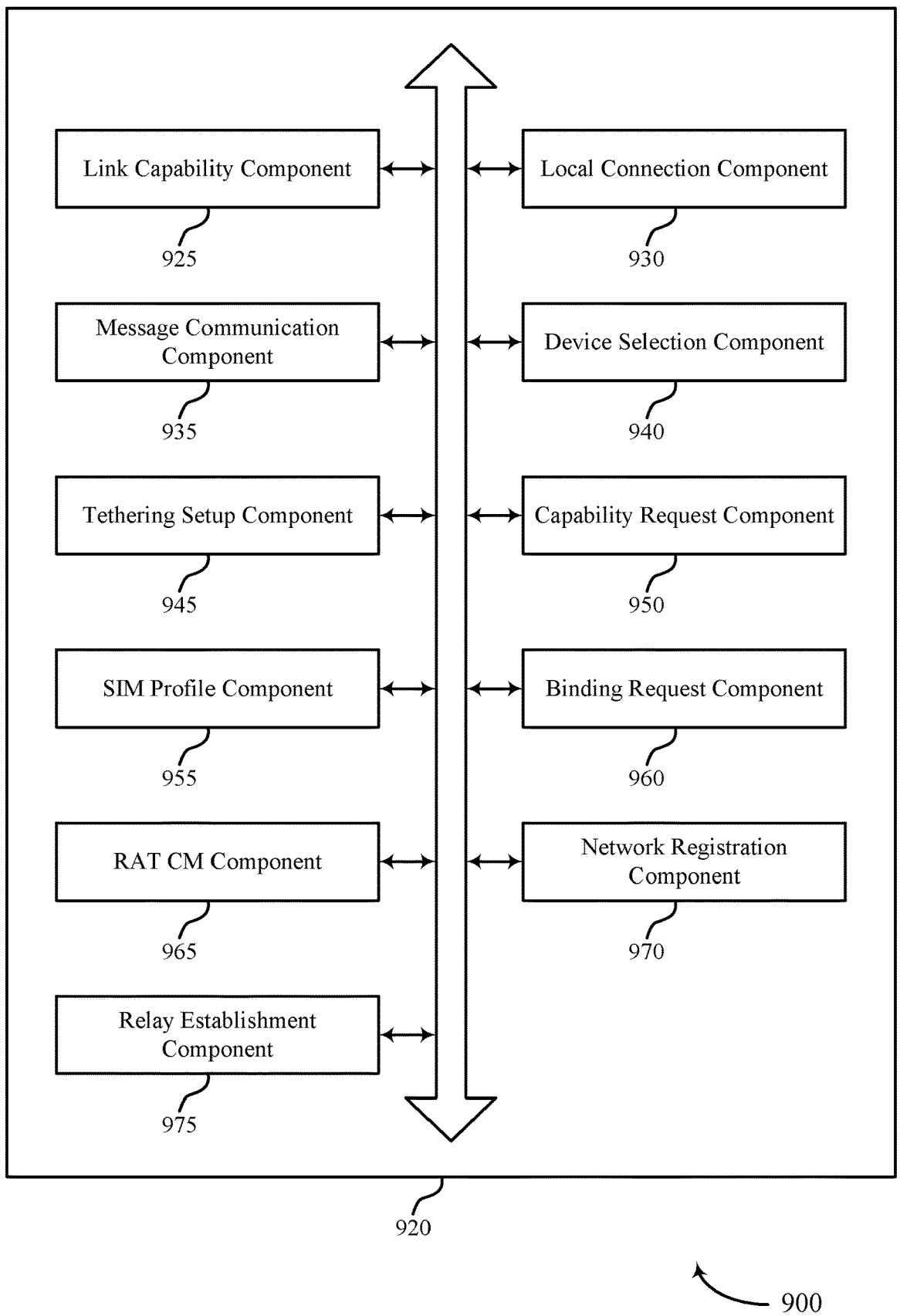
FIG. 9 shows a block diagram of a communications manager that supports device selection procedures for in-vehicle network connectivity in accordance with one or more aspects of the present disclosure.

FIG. 9 shows a block diagram 900 of a communications manager 920 that supports device selection procedures for in-vehicle network connectivity in accordance with one or more aspects of the present disclosure. The communications manager 920 may be an example of aspects of a communications manager 720, a communications manager 820, or both, as described herein. The communications manager 920, or various components thereof, may be an example of means for performing various aspects of device selection procedures for in-vehicle network connectivity as described herein. For example, the communications manager 920 may include a link capability component 925, a local connection component 930, a message communication component 935, a device selection component 940, a tethering setup component 945, a capability request component 950, an SIM profile component 955, a binding request component 960, a RAT CM component 965, a network registration component 970, a relay establishment component 975, or any combination thereof. Each of these components may communicate, directly or indirectly, with one another (e.g., via one or more buses).

The communications manager 920 may support wireless communication at a first UE in accordance with examples disclosed herein. The link capability component 925 may be configured as or otherwise support a means for receiving, from a second UE that has a cellular wireless connection with a network entity of a cellular wireless network, link capability information associated with a subscription of the second UE to the cellular wireless network. The local connection component 930 may be configured as or otherwise support a means for establishing a local wireless connection with the second UE based on the link capability information associated with the subscription of the second UE to the cellular wireless network. The message communication component 935 may be configured as or otherwise support a means for communicating one or more messages with the network entity of the cellular wireless network via the second UE using first SIM credentials of the first UE or second SIM credentials of the second UE based on establishing the local wireless connection with the second UE.

In some examples, the link capability component 925 may be configured as or otherwise support a means for exchanging link capability information with a multiple UEs, including the second UE. In some examples, the device selection component 940 may be configured as or otherwise support a means for selecting, from the multiple UEs, the second UE to relay communications between the first UE and the cellular wireless network based on the link capability information associated with the multiple UEs, including the link capability information associated with the second UE.

In some examples, to support receiving the link capability information, the link capability component 925 may be configured as or otherwise support a means for receiving tethering capability information from the second UE via one or more discovery messages during a discovery process.

In some examples, the tethering setup component 945 may be configured as or otherwise support a means for performing a tethering setup process with the second UE based on selecting the second UE to relay communications between the first UE and the cellular wireless network, where establishing the local wireless connection with the second UE is based on the tethering setup process.

In some examples, the message communication component 935 may be configured as or otherwise support a means for transmitting one or more messages that indicate one or more device tethering capabilities, subscription capabilities, RAT capabilities, antenna capabilities, power capabilities, local link capabilities, OTA capabilities, or device loading capabilities of the first UE.

In some examples, to support receiving the link capability information, the link capability component 925 may be configured as or otherwise support a means for receiving one or more messages that indicate one or more device tethering capabilities, subscription capabilities, RAT capabilities, antenna capabilities, power capabilities, local link capabilities, OTA capabilities, or device loading capabilities of the second UE.

In some examples, the capability request component 950 may be configured as or otherwise support a means for transmitting, via the local wireless connection, a request for cellular capability information associated with the second UE. In some examples, the link capability component 925 may be configured as or otherwise support a means for receiving, via the local wireless connection, a response indicating the cellular capability information associated with the second UE.

In some examples, the device selection component 940 may be configured as or otherwise support a means for performing a relay device selection procedure based on the cellular capability information associated with the second UE, where communicating with the network entity of the cellular wireless network via the second UE is based on the relay device selection procedure.

In some examples, the capability request component 950 may be configured as or otherwise support a means for transmitting, via the local wireless connection, a request for RAT capability information associated with the second UE. In some examples, the link capability component 925 may be configured as or otherwise support a means for receiving, via the local wireless connection, a response indicating the RAT capability information associated with the second UE. In some examples, the device selection component 940 may be configured as or otherwise support a means for selecting the second UE to relay communications between the first UE and the cellular wireless network based on the RAT capability information associated with the second UE.

In some examples, the device selection component 940 may be configured as or otherwise support a means for selecting the second UE to relay communications between the first UE and the cellular wireless network based on obtaining full capability information for the second UE.

In some examples, the local connection component 930 may be configured as or otherwise support a means for switching from the local wireless connection with the second UE to a second local wireless connection with a different UE in response to a characteristic of the local wireless connection satisfying a path switching condition.

In some examples, to support receiving the link capability information, the link capability component 925 may be configured as or otherwise support a means for receiving the link capability information from the second UE via a sidelink RRC reconfiguration procedure, a RAT CM capability exchange procedure, or both.

In some examples, the SIM profile component 955 may be configured as or otherwise support a means for receiving an indication of an eSIM profile of the second UE via a SIM access profile exchange. In some examples, the binding request component 960 may be configured as or otherwise support a means for transmitting a request to associate the eSIM profile of the second UE with a SIM subscription of the first UE, where communicating with the network entity of the cellular wireless network via the second UE is based on associating the eSIM profile of the second UE with the SIM subscription of the first UE.

In some examples, to support receiving the link capability information, the link capability component 925 may be configured as or otherwise support a means for receiving SIM information from the second UE after selecting the second UE to relay communications between the first UE and the cellular wireless network, where the SIM information is received via a SIM access profile exchange.

In some examples, the RAT CM component 965 may be configured as or otherwise support a means for exchanging one or more RAT CM messages with the second UE via the local wireless connection, where the one or more RAT CM messages indicate an eSIM profile of the second UE. In some examples, the local wireless connection between the first UE and the second UE includes a cellular sidelink connection, a Wi-Fi connection, a Bluetooth connection, a secured wireless connection, or a combination thereof.

Additionally, or alternatively, the communications manager 920 may support wireless communication at a second UE in accordance with examples disclosed herein. In some examples, the link capability component 925 may be configured as or otherwise support a means for transmitting, to a first UE, link capability information associated with a subscription of the second UE to a cellular wireless network, the second UE having a cellular wireless connection with a network entity of the cellular wireless network. In some examples, the local connection component 930 may be configured as or otherwise support a means for establishing a local wireless connection with the first UE based on the link capability information associated with the subscription of the second UE to the cellular wireless network. In some examples, the message communication component 935 may be configured as or otherwise support a means for communicating one or more messages between the first UE and the network entity of the cellular wireless network using first SIM credentials of the first UE or second SIM credentials of the second UE based on establishing the local wireless connection with the first UE.

In some examples, the device selection component 940 may be configured as or otherwise support a means for selecting the first UE as a remote device for the second UE based on cellular connection capabilities associated with one or more SIMS of the first UE.

In some examples, the SIM profile component 955 may be configured as or otherwise support a means for transmitting, via the local wireless connection, a request for a SIM profile of the first UE. In some examples, the SIM profile component 955 may be configured as or otherwise support a means for receiving an indication of the SIM profile of the first UE via a SIM access profile exchange.

In some examples, the binding request component 960 may be configured as or otherwise support a means for transmitting, via the local wireless connection, a request to initiate a SIM binding procedure with the cellular wireless network, where communicating the one or more messages between the first UE and the network entity of the cellular wireless network is based on the SIM binding procedure.

In some examples, the SIM profile component 955 may be configured as or otherwise support a means for transmitting an indication of an eSIM profile of the second UE via a SIM access profile exchange, where the eSIM profile of the second UE is used to perform the SIM binding procedure with the cellular wireless network.

In some examples, the RAT CM component 965 may be configured as or otherwise support a means for performing a RAT CM exchange procedure to transfer an eSIM profile of the second UE to the first UE, where the eSIM profile of the second UE is used to perform the SIM binding procedure with the cellular wireless network.

In some examples, the SIM profile component 955 may be configured as or otherwise support a means for exchanging SIM information with the first UE via a SIM access profile exchange. In some examples, the RAT CM component 965 may be configured as or otherwise support a means for transmitting, via the local wireless connection, a request for a RAT CM device profile of the first UE. In some examples, the RAT CM component 965 may be configured as or otherwise support a means for receiving, via the local wireless connection, an indication of the RAT CM device profile of the first UE.

In some examples, the network registration component 970 may be configured as or otherwise support a means for registering with the cellular wireless network using the SIM information provided by the first UE, the RAT CM device profile of the first UE, or both.

In some examples, the relay establishment component 975 may be configured as or otherwise support a means for establishing a relay connection between the first UE and the cellular wireless network based on the RAT CM device profile of the first UE.

In some examples, the link capability component 925 may be configured as or otherwise support a means for receiving one or more messages that indicate one or more device tethering capabilities, subscription capabilities, RAT capabilities, antenna capabilities, power capabilities, local link capabilities, OTA capabilities, or device loading capabilities of the first UE.

In some examples, to support transmitting the link capability information, the link capability component 925 may be configured as or otherwise support a means for transmitting one or more messages that indicate one or more device tethering capabilities, subscription capabilities, RAT capabilities, antenna capabilities, power capabilities, local link capabilities, OTA capabilities, or device loading capabilities of the second UE.

In some examples, the capability request component 950 may be configured as or otherwise support a means for receiving, via the local wireless connection, a request for cellular capability information associated with the second UE. In some examples, the link capability component 925 may be configured as or otherwise support a means for transmitting, via the local wireless connection, a response indicating the cellular capability information associated with the second UE.

Figure 10:
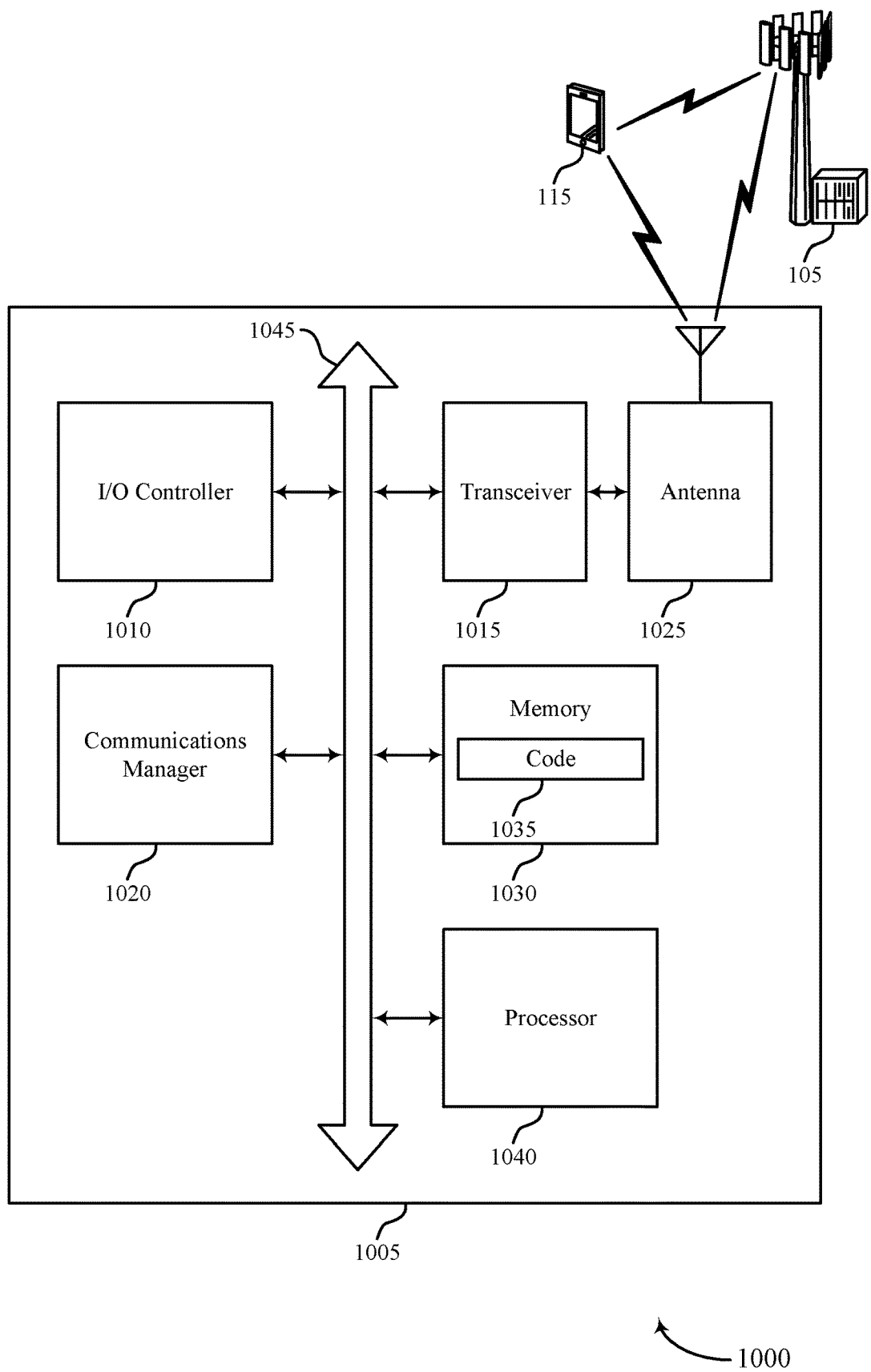
FIG. 10 shows a diagram of a system including a device that supports device selection procedures for in-vehicle network connectivity in accordance with one or more aspects of the present disclosure.

FIG. 10 shows a diagram of a system 1000 including a device 1005 that supports device selection procedures for in-vehicle network connectivity in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting device selection procedures for in-vehicle network connectivity). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples disclosed herein. For example, the communications manager 1020 may be configured as or otherwise support a means for receiving, from a second UE that has a cellular wireless connection with a network entity of a cellular wireless network, link capability information associated with a subscription of the second UE to the cellular wireless network.

The communications manager 1020 may be configured as or otherwise support a means for establishing a local wireless connection with the second UE based on the link capability information associated with the subscription of the second UE to the cellular wireless network. The communications manager 1020 may be configured as or otherwise support a means for communicating one or more messages with the network entity of the cellular wireless network via the second UE using first SIM credentials of the first UE or second SIM credentials of the second UE based on establishing the local wireless connection with the second UE.

Additionally, or alternatively, the communications manager 1020 may support wireless communication at a second UE in accordance with examples disclosed herein. For example, the communications manager 1020 may be configured as or otherwise support a means for transmitting, to a first UE, link capability information associated with a subscription of the second UE to a cellular wireless network, the second UE having a cellular wireless connection with a network entity of the cellular wireless network. The communications manager 1020 may be configured as or otherwise support a means for establishing a local wireless connection with the first UE based on the link capability information associated with the subscription of the second UE to the cellular wireless network. The communications manager 1020 may be configured as or otherwise support a means for communicating one or more messages between the first UE and the network entity of the cellular wireless network using first SIM credentials of the first UE or second SIM credentials of the second UE based on establishing the local wireless connection with the first UE.

By including or configuring the communications manager 1020 in accordance with examples as described herein, the device 1005 may support techniques for improved in-vehicle connectivity by enabling the device 1005 to exchange link capability information (SIM profile information, cellular capability information) with one or more candidate relay devices. The device 1005 may use this link capability information to select a suitable relay device and communicate with a cellular wireless network via the selected relay device. Thus, rather than establishing a relay connection with a default communication device, the device 1005 may select a candidate relay device with compatible device attributes, which may improve the likelihood of successful communications between the device 1005 and the cellular wireless network.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of device selection procedures for in-vehicle network connectivity as described herein, or the processor 1040 and the memory 1030 may be otherwise configured to perform or support such operations.

Figure 11:
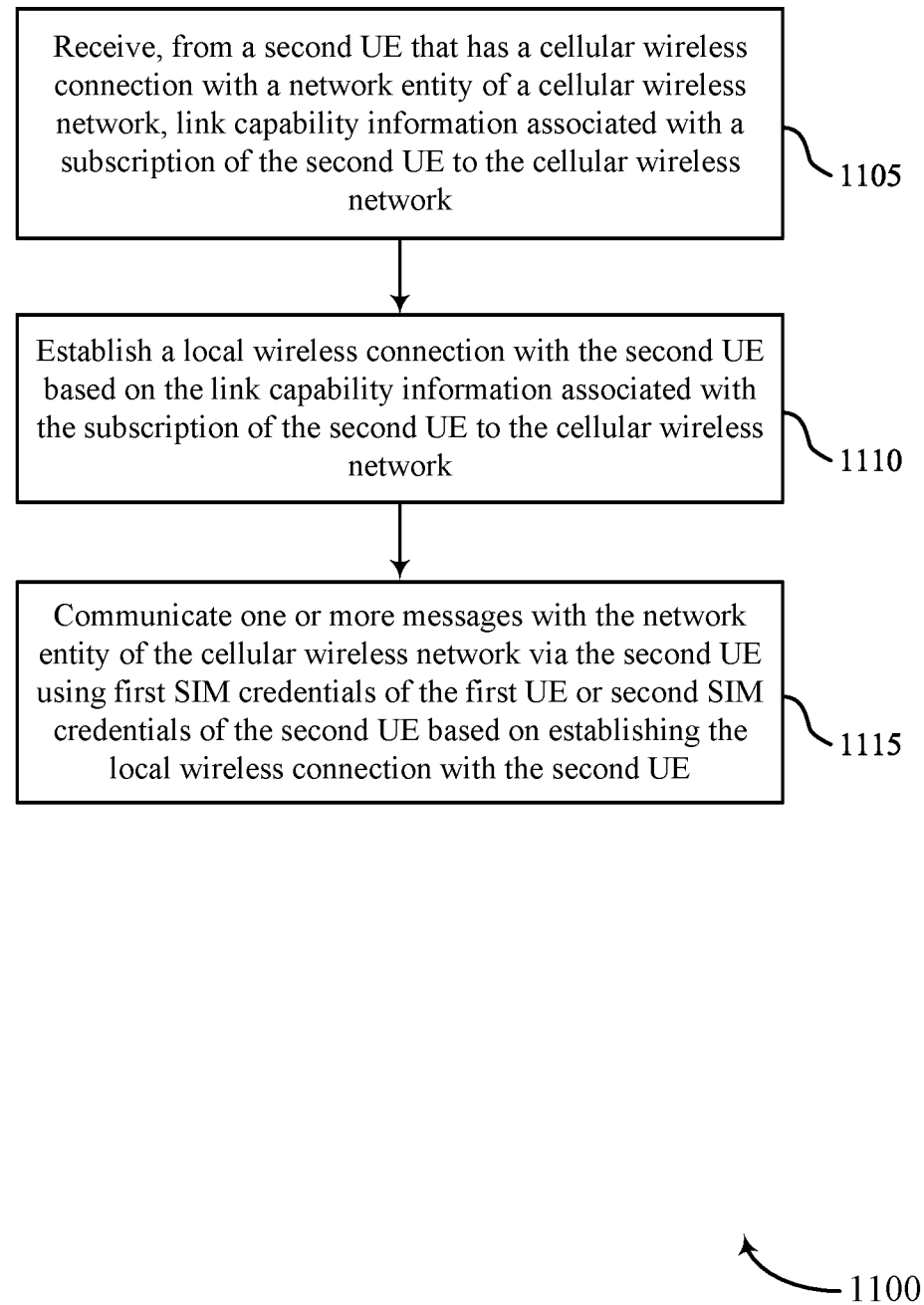
FIGS. 11 through 14 show flowcharts illustrating methods that support device selection procedures for in-vehicle network connectivity in accordance with one or more aspects of the present disclosure.

FIG. 11 shows a flowchart illustrating a method 1100 that supports device selection procedures for in-vehicle network connectivity in accordance with one or more aspects of the present disclosure. The operations of the method 1100 may be implemented by a UE or components thereof. For example, the operations of the method 1100 may be performed by a UE 115, as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, a first UE may receive, from a second UE that has a cellular wireless connection with a network entity of a cellular wireless network, link capability information associated with a subscription of the second UE to the cellular wireless network. The operations of 1105 may be performed in accordance with examples disclosed herein. In some examples, aspects of the operations of 1105 may be performed by a link capability component 925, as described with reference to FIG. 9.

At 1110, the first UE may establish a local wireless connection with the second UE based on the link capability information associated with the subscription of the second UE to the cellular wireless network. The operations of 1110 may be performed in accordance with examples disclosed herein. In some examples, aspects of the operations of 1110 may be performed by a local connection component 930, as described with reference to FIG. 9.

At 1115, the first UE may communicate one or more messages with the network entity of the cellular wireless network via the second UE using first SIM credentials of the first UE or second SIM credentials of the second UE based on establishing the local wireless connection with the second UE. The operations of 1115 may be performed in accordance with examples disclosed herein. In some examples, aspects of the operations of 1115 may be performed by a message communication component 935, as described with reference to FIG. 9.

Figure 12:
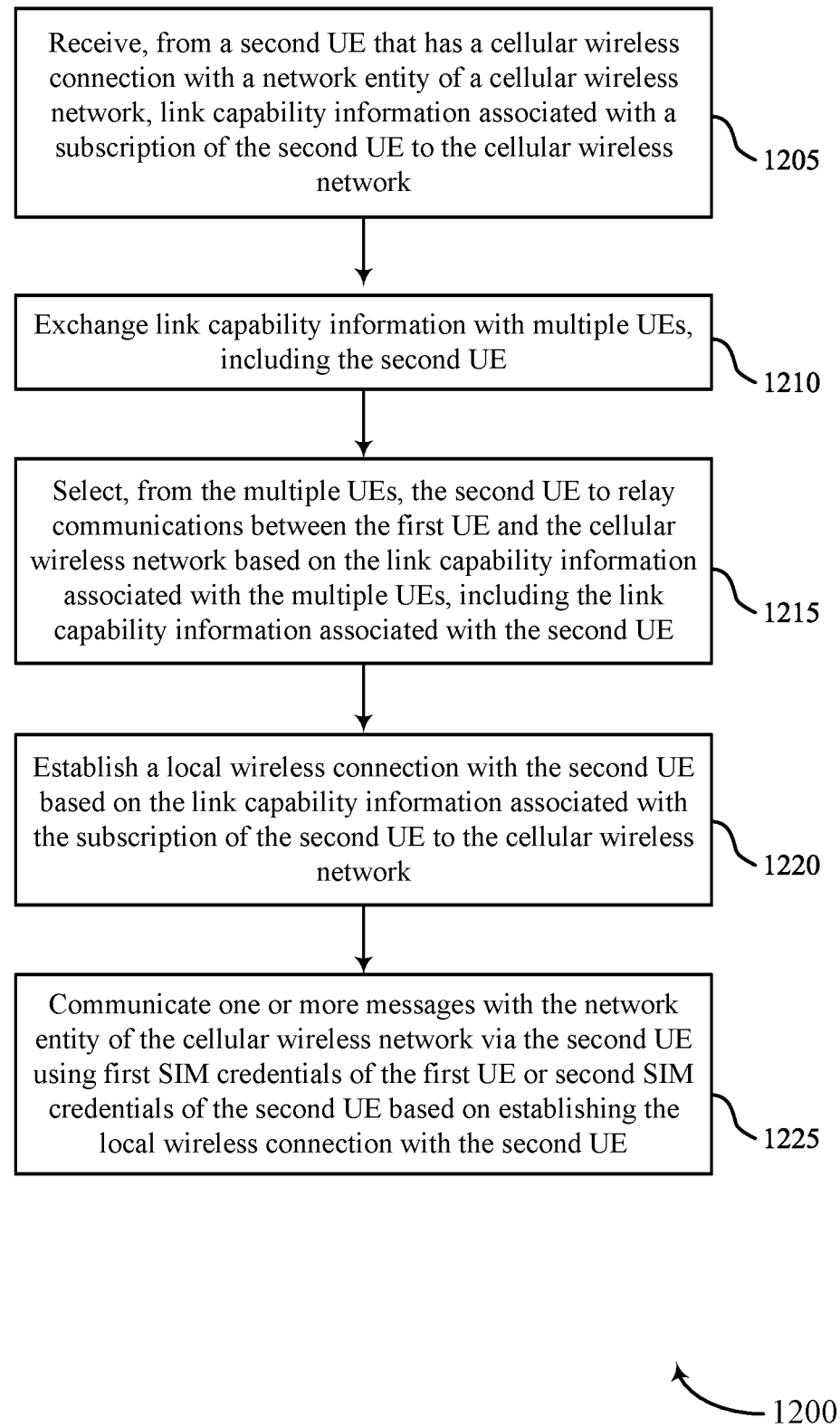

FIG. 12 shows a flowchart illustrating a method 1200 that supports device selection procedures for in-vehicle network connectivity in accordance with one or more aspects of the present disclosure. The operations of the method 1200 may be implemented by a UE or components thereof. For example, the operations of the method 1200 may be performed by a UE 115, as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, a first UE may receive, from a second UE that has a cellular wireless connection with a network entity of a cellular wireless network, link capability information associated with a subscription of the second UE to the cellular wireless network. The operations of 1205 may be performed in accordance with examples disclosed herein. In some examples, aspects of the operations of 1205 may be performed by a link capability component 925, as described with reference to FIG. 9.

At 1210, the first UE may exchange link capability information with multiple UEs, including the second UE. The operations of 1210 may be performed in accordance with examples disclosed herein. In some examples, aspects of the operations of 1210 may be performed by a link capability component 925, as described with reference to FIG. 9.

At 1215, the first UE may select, from the multiple UEs, the second UE to relay communications between the first UE and the cellular wireless network based on the link capability information associated with the multiple UEs, including the link capability information associated with the second UE. The operations of 1215 may be performed in accordance with examples disclosed herein. In some examples, aspects of the operations of 1215 may be performed by a device selection component 940, as described with reference to FIG. 9.

At 1220, the first UE may establish a local wireless connection with the second UE based on the link capability information associated with the subscription of the second UE to the cellular wireless network. The operations of 1220 may be performed in accordance with examples disclosed herein. In some examples, aspects of the operations of 1220 may be performed by a local connection component 930, as described with reference to FIG. 9.

At 1225, the first UE may communicate one or more messages with the network entity of the cellular wireless network via the second UE using first SIM credentials of the first UE or second SIM credentials of the second UE based on establishing the local wireless connection with the second UE. The operations of 1225 may be performed in accordance with examples disclosed herein. In some examples, aspects of the operations of 1225 may be performed by a message communication component 935, as described with reference to FIG. 9.

Figure 13:
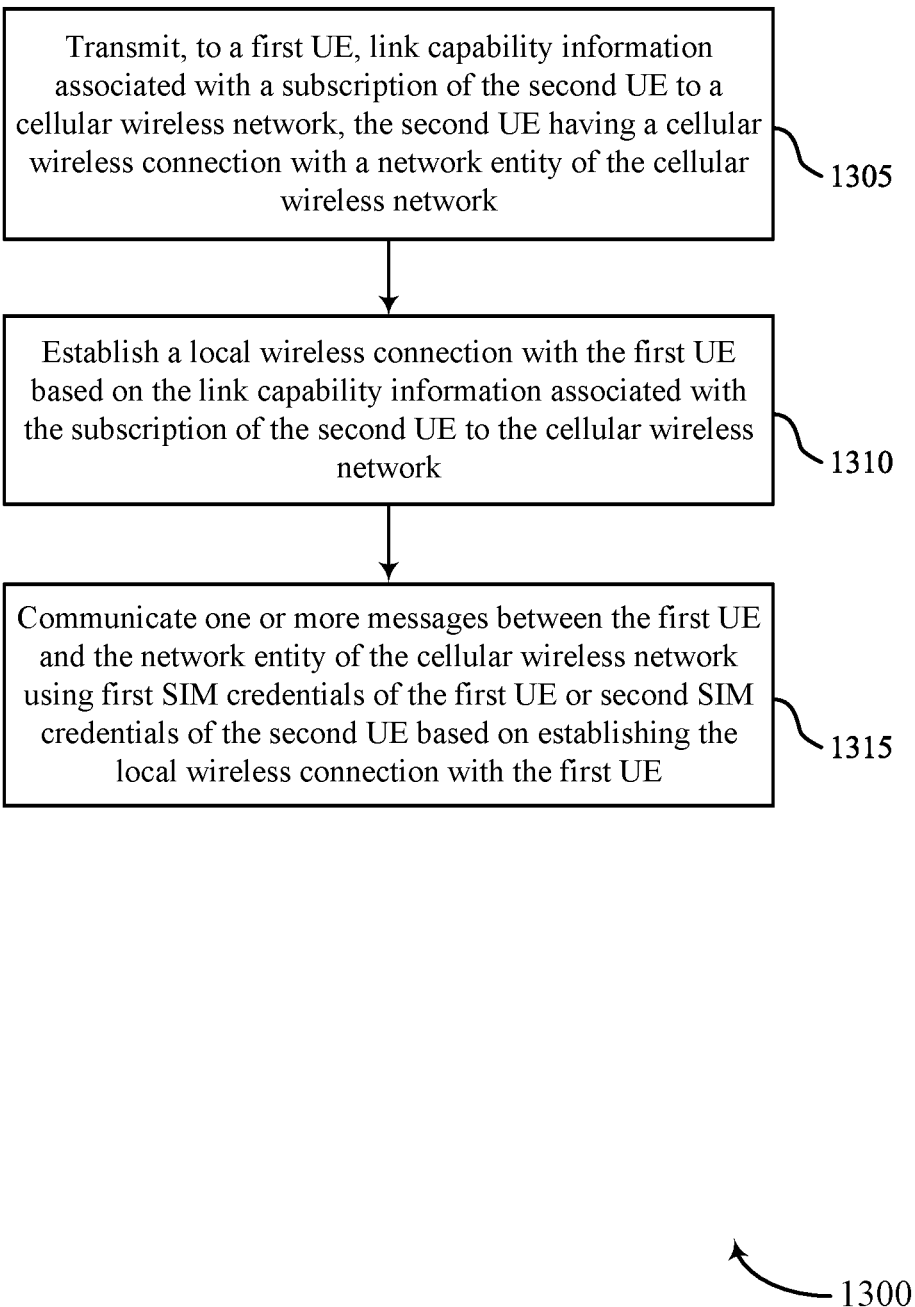

FIG. 13 shows a flowchart illustrating a method 1300 that supports device selection procedures for in-vehicle network connectivity in accordance with one or more aspects of the present disclosure. The operations of the method 1300 may be implemented by a UE or components thereof. For example, the operations of the method 1300 may be performed by a UE 115, as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, a second UE may transmit, to a first UE, link capability information associated with a subscription of the second UE to a cellular wireless network, the second UE having a cellular wireless connection with a network entity of the cellular wireless network. The operations of 1305 may be performed in accordance with examples disclosed herein. In some examples, aspects of the operations of 1305 may be performed by a link capability component 925, as described with reference to FIG. 9.

At 1310, the second UE may establish a local wireless connection with the first UE based on the link capability information associated with the subscription of the second UE to the cellular wireless network. The operations of 1310 may be performed in accordance with examples disclosed herein. In some examples, aspects of the operations of 1310 may be performed by a local connection component 930, as described with reference to FIG. 9.

At 1315, the second UE may communicate one or more messages between the first UE and the network entity of the cellular wireless network using first SIM credentials of the first UE or second SIM credentials of the second UE based on establishing the local wireless connection with the first UE. The operations of 1315 may be performed in accordance with examples disclosed herein. In some examples, aspects of the operations of 1315 may be performed by a message communication component 935, as described with reference to FIG. 9.

Figure 14:
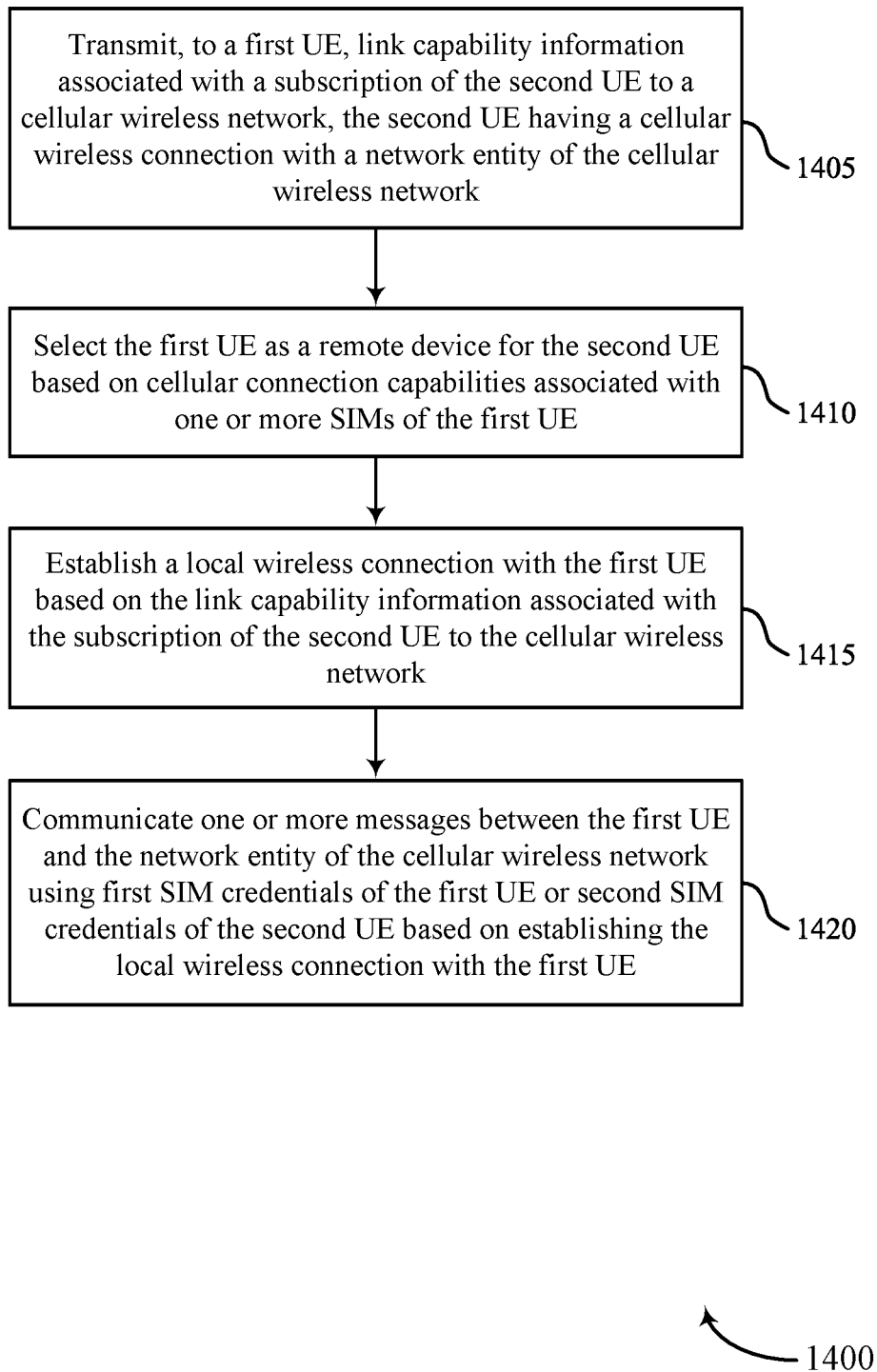

FIG. 14 shows a flowchart illustrating a method 1400 that supports device selection procedures for in-vehicle network connectivity in accordance with one or more aspects of the present disclosure. The operations of the method 1400 may be implemented by a UE or components thereof. For example, the operations of the method 1400 may be performed by a UE 115, as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, a second UE may transmit, to a first UE, link capability information associated with a subscription of the second UE to a cellular wireless network, the second UE having a cellular wireless connection with a network entity of the cellular wireless network. The operations of 1405 may be performed in accordance with examples disclosed herein. In some examples, aspects of the operations of 1405 may be performed by a link capability component 925, as described with reference to FIG. 9.

At 1410, the second UE may select the first UE as a remote device for the second UE based on cellular connection capabilities associated with one or more SIMs of the first UE. The operations of 1410 may be performed in accordance with examples disclosed herein. In some examples, aspects of the operations of 1410 may be performed by a device selection component 940, as described with reference to FIG. 9.

At 1415, the second UE may establish a local wireless connection with the first UE based on the link capability information associated with the subscription of the second UE to the cellular wireless network. The operations of 1415 may be performed in accordance with examples disclosed herein. In some examples, aspects of the operations of 1415 may be performed by a local connection component 930, as described with reference to FIG. 9.

At 1420, the second UE may communicate one or more messages between the first UE and the network entity of the cellular wireless network using first SIM credentials of the first UE or second SIM credentials of the second UE based on establishing the local wireless connection with the first UE. The operations of 1420 may be performed in accordance with examples disclosed herein. In some examples, aspects of the operations of 1420 may be performed by a message communication component 935, as described with reference to FIG. 9.

The following provides an overview of aspects of the present disclosure:

Aspect 1: A method for wireless communication at a first UE, comprising: receiving, from a second UE that has a cellular wireless connection with a network entity of a cellular wireless network, link capability information associated with a subscription of the second UE to the cellular wireless network; establishing a local wireless connection with the second UE based at least in part on the link capability information associated with the subscription of the second UE to the cellular wireless network; and communicating one or more messages with the network entity of the cellular wireless network via the second UE using first subscriber identity module credentials of the first UE or second subscriber identity module credentials of the second UE based at least in part on establishing the local wireless connection with the second UE.

Aspect 2: The method of aspect 1, further comprising: exchanging link capability information with a plurality of UEs, including the second UE; and selecting, from the plurality of UEs, the second UE to relay communications between the first UE and the cellular wireless network based at least in part on the link capability information associated with the plurality of UEs, including the link capability information associated with the second UE.

Aspect 3: The method of any of aspects 1 through 2, wherein receiving the link capability information comprises: receiving tethering capability information from the second UE via one or more discovery messages during a discovery process.

Aspect 4: The method of any of aspects 1 through 3, further comprising: performing a tethering setup process with the second UE based at least in part on selecting the second UE to relay communications between the first UE and the cellular wireless network, wherein establishing the local wireless connection with the second UE is based at least in part on the tethering setup process.

Aspect 5: The method of any of aspects 1 through 4, further comprising: transmitting one or more messages that indicate one or more device tethering capabilities, subscription capabilities, radio access technology capabilities, antenna capabilities, power capabilities, local link capabilities, over-the-air capabilities, device loading capabilities of the first UE.

Aspect 6: The method of any of aspects 1 through 5, wherein receiving the link capability information comprises: receiving one or more messages that indicate one or more device tethering capabilities, subscription capabilities, radio access technology capabilities, antenna capabilities, power capabilities, local link capabilities, over-the-air capabilities, or device loading capabilities of the second UE.

Aspect 7: The method of any of aspects 1 through 6, further comprising: transmitting, via the local wireless connection, a request for cellular capability information associated with the second UE; and receiving, via the local wireless connection, a response indicating the cellular capability information associated with the second UE.

Aspect 8: The method of aspect 7, further comprising: performing a relay device selection procedure based at least in part on the cellular capability information associated with the second UE, wherein communicating with the network entity of the cellular wireless network via the second UE is based at least in part on the relay device selection procedure.

Aspect 9: The method of any of aspects 1 through 8, further comprising: transmitting, via the local wireless connection, a request for radio access technology capability information associated with the second UE; receiving, via the local wireless connection, a response indicating the radio access technology capability information associated with the second UE; and selecting the second UE to relay communications between the first UE and the cellular wireless network based at least in part on the radio access technology capability information associated with the second UE.

Aspect 10: The method of any of aspects 1 through 9, further comprising: selecting the second UE to relay communications between the first UE and the cellular wireless network based at least in part on obtaining full capability information for the second UE.

Aspect 11: The method of any of aspects 1 through 10, further comprising: switching from the local wireless connection with the second UE to a second local wireless connection with a different UE in response to a characteristic of the local wireless connection satisfying a path switching condition.

Aspect 12: The method of any of aspects 1 through 11, wherein receiving the link capability information comprises: receiving the link capability information from the second UE via a sidelink radio resource control reconfiguration procedure, a radio access technology configuration management capability exchange procedure, or both.

Aspect 13: The method of any of aspects 1 through 12, further comprising: receiving an indication of an embedded subscriber identity module profile of the second UE via a subscriber identity module access profile exchange; and transmitting a request to associate the embedded subscriber identity module profile of the second UE with a subscriber identity module subscription of the first UE, wherein communicating with the network entity of the cellular wireless network via the second UE is based at least in part on associating the embedded subscriber identity module profile of the second UE with the subscriber identity module subscription of the first UE.

Aspect 14: The method of any of aspects 1 through 13, wherein receiving the link capability information comprises: receiving subscriber identity module information from the second UE after selecting the second UE to relay communications between the first UE and the cellular wireless network, wherein the subscriber identity module information is received via a subscriber identity module access profile exchange.

Aspect 15: The method of any of aspects 1 through 14, further comprising: exchanging one or more radio access technology configuration management messages with the second UE via the local wireless connection, wherein the one or more radio access technology configuration management messages indicate an embedded subscriber identity module profile of the second UE.

Aspect 16: The method of any of aspects 1 through 15, wherein the local wireless connection between the first UE and the second UE comprises a cellular sidelink connection, a Wi-Fi connection, a Bluetooth connection, a secured wireless connection, or a combination thereof.

Aspect 17: A method for wireless communication at a second UE, comprising: transmitting, to a first UE, link capability information associated with a subscription of the second UE to a cellular wireless network, the second UE having a cellular wireless connection with a network entity of the cellular wireless network; establishing a local wireless connection with the first UE based at least in part on the link capability information associated with the subscription of the second UE to the cellular wireless network; and communicating one or more messages between the first UE and the network entity of the cellular wireless network using first subscriber identity module credentials of the first UE or second subscriber identity module credentials of the second UE based at least in part on establishing the local wireless connection with the first UE.

Aspect 18: The method of aspect 17, further comprising: selecting the first UE as a remote device for the second UE based at least in part on cellular connection capabilities associated with one or more subscriber identity modules of the first UE.

Aspect 19: The method of any of aspects 17 through 18, further comprising: transmitting, via the local wireless connection, a request for a subscriber identity module profile of the first UE; and receiving an indication of the subscriber identity module profile of the first UE via a subscriber identity module access profile exchange.

Aspect 20: The method of any of aspects 17 through 19, further comprising: transmitting, via the local wireless connection, a request to initiate a subscriber identity module binding procedure with the cellular wireless network, wherein communicating the one or more messages between the first UE and the network entity of the cellular wireless network is based at least in part on the subscriber identity module binding procedure.

Aspect 21: The method of aspect 20, further comprising: transmitting an indication of an embedded subscriber identity module profile of the second UE via a subscriber identity module access profile exchange, wherein the embedded subscriber identity module profile of the second UE is used to perform the subscriber identity module binding procedure with the cellular wireless network.

Aspect 22: The method of any of aspects 20 through 21, further comprising: performing a radio access technology configuration management exchange procedure to transfer an embedded subscriber identity module profile of the second UE to the first UE, wherein the embedded subscriber identity module profile of the second UE is used to perform the subscriber identity module binding procedure with the cellular wireless network.

Aspect 23: The method of any of aspects 17 through 22, further comprising: exchanging subscriber identity module information with the first UE via a subscriber identity module access profile exchange; transmitting, via the local wireless connection, a request for a radio access technology configuration management device profile of the first UE; and receiving, via the local wireless connection, an indication of the radio access technology configuration management device profile of the first UE.

Aspect 24: The method of aspect 23, further comprising: registering with the cellular wireless network using the subscriber identity module information provided by the first UE, the radio access technology configuration management device profile of the first UE, or both.

Aspect 25: The method of any of aspects 23 through 24, further comprising: establishing a relay connection between the first UE and the cellular wireless network based at least in part on the radio access technology configuration management device profile of the first UE.

Aspect 26: The method of any of aspects 17 through 25, further comprising: receiving one or more messages that indicate one or more device tethering capabilities, subscription capabilities, radio access technology capabilities, antenna capabilities, power capabilities, local link capabilities, over-the-air capabilities, or device loading capabilities of the first UE.

Aspect 27: The method of any of aspects 17 through 26, wherein transmitting the link capability information comprises: transmitting one or more messages that indicate one or more device tethering capabilities, subscription capabilities, radio access technology capabilities, antenna capabilities, power capabilities, local link capabilities, over-the-air capabilities, or device loading capabilities of the second UE.

Aspect 28: The method of any of aspects 17 through 27, further comprising: receiving, via the local wireless connection, a request for cellular capability information associated with the second UE; and transmitting, via the local wireless connection, a response indicating the cellular capability information associated with the second UE.

Aspect 29: An apparatus for wireless communication at a first UE, comprising a processor, memory coupled with the processor, and instructions stored in the memory, wherein the instructions are executable by the processor to cause the apparatus to perform a method of any of aspects 1 through 16.

Aspect 30: An apparatus for wireless communication at a first UE, comprising at least one means for performing a method of any of aspects 1 through 16.

Aspect 31: A non-transitory computer-readable medium storing code for wireless communication at a first UE, the code comprising instructions executable by a processor to perform a method of any of aspects 1 through 16.

Aspect 32: An apparatus for wireless communication at a second UE, comprising a processor, memory coupled with the processor, and instructions stored in the memory, wherein the instructions are executable by the processor to cause the apparatus to perform a method of any of aspects 17 through 28.

Aspect 33: An apparatus for wireless communication at a second UE, comprising at least one means for performing a method of any of aspects 17 through 28.

Aspect 34: A non-transitory computer-readable medium storing code for wireless communication at a second UE, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor,
    memory coupled with the processor; and
    instructions stored in the memory and executable by the processor to cause the apparatus to:
        receive, from a second UE that has a cellular wireless connection with a network entity of a cellular wireless network, link capability information associated with a subscription of the second UE to the cellular wireless network;
        establish a local wireless connection with the second UE based at least in part on the link capability information associated with the subscription of the second UE to the cellular wireless network;
        transmit, via the local wireless connection, a request for cellular capability information associated with the second UE;
        receive, via the local wireless connection, a response indicating the cellular capability information associated with the second UE; and
        communicate one or more messages with the network entity of the cellular wireless network via the second UE using first subscriber identity module credentials of the first UE or second subscriber identity module credentials of the second UE based at least in part on establishing the local wireless connection with the second UE.

2. The apparatus of claim 1, wherein the instructions are further executable by the processor to cause the apparatus to:
    exchange link capability information with a plurality of UEs, including the second UE; and
    select, from the plurality of UEs, the second UE to relay communications between the first UE and the cellular wireless network based at least in part on the link capability information associated with the plurality of UEs, including the link capability information associated with the second UE.

3. The apparatus of claim 1, wherein, to receive the link capability information, the instructions are executable by the processor to cause the apparatus to:
    receive tethering capability information from the second UE via one or more discovery messages during a discovery process.

4. The apparatus of claim 1, wherein the instructions are further executable by the processor to cause the apparatus to:
    perform a tethering setup process with the second UE based at least in part on selecting the second UE to relay communications between the first UE and the cellular wireless network, wherein establishing the local wireless connection with the second UE is based at least in part on the tethering setup process.

5. The apparatus of claim 1, wherein the instructions are further executable by the processor to cause the apparatus to:
   transmit one or more messages that indicate one or more device tethering capabilities, subscription capabilities, radio access technology capabilities, antenna capabilities, power capabilities, local link capabilities, over-the-air capabilities, or device loading capabilities of the first UE.

6. The apparatus of claim 1, wherein, to receive the link capability information, the instructions are executable by the processor to cause the apparatus to:
   receive one or more messages that indicate one or more device tethering capabilities, subscription capabilities, radio access technology capabilities, antenna capabilities, power capabilities, local link capabilities, over-the-air capabilities, or device loading capabilities of the second UE.

7. The apparatus of claim 1, wherein the instructions are further executable by the processor to cause the apparatus to:
   perform a relay device selection procedure based at least in part on the cellular capability information associated with the second UE, wherein communicating with the network entity of the cellular wireless network via the second UE is based at least in part on the relay device selection procedure.

8. The apparatus of claim 1, wherein the instructions are further executable by the processor to cause the apparatus to:
   transmit, via the local wireless connection, a request for radio access technology capability information associated with the second UE;
   receive, via the local wireless connection, a response indicating the radio access technology capability information associated with the second UE; and
   select the second UE to relay communications between the first UE and the cellular wireless network based at least in part on the radio access technology capability information associated with the second UE.

9. The apparatus of claim 1, wherein the instructions are further executable by the processor to cause the apparatus to:
   select the second UE to relay communications between the first UE and the cellular wireless network based at least in part on obtaining full capability information for the second UE.

10. The apparatus of claim 1, wherein the instructions are further executable by the processor to cause the apparatus to:
    switch from the local wireless connection with the second UE to a second local wireless connection with a different UE in response to a characteristic of the local wireless connection satisfying a path switching condition.

11. The apparatus of claim 1, wherein, to receive the link capability information, the instructions are executable by the processor to cause the apparatus to:
    receive the link capability information from the second UE via a sidelink radio resource control reconfiguration procedure, a radio access technology configuration management capability exchange procedure, or both.

12. The apparatus of claim 1, wherein the instructions are further executable by the processor to cause the apparatus to:
    receive an indication of an embedded subscriber identity module profile of the second UE via a subscriber identity module access profile exchange; and
    transmit a request to associate the embedded subscriber identity module profile of the second UE with a subscriber identity module subscription of the first UE, wherein communicating with the network entity of the cellular wireless network via the second UE is based at least in part on associating the embedded subscriber identity module profile of the second UE with the subscriber identity module subscription of the first UE.

13. The apparatus of claim 1, wherein, to receive the link capability information, the instructions are executable by the processor to cause the apparatus to:
    receive subscriber identity module information from the second UE after selecting the second UE to relay communications between the first UE and the cellular wireless network, wherein the subscriber identity module information is received via a subscriber identity module access profile exchange.

14. The apparatus of claim 1, wherein the instructions are further executable by the processor to cause the apparatus to:
    exchange one or more radio access technology configuration management messages with the second UE via the local wireless connection, wherein the one or more radio access technology configuration management messages indicate an embedded subscriber identity module profile of the second UE.

15. The apparatus of claim 1, wherein the local wireless connection between the first UE and the second UE comprises a cellular sidelink connection, a Wi-Fi connection, a Bluetooth connection, a secured wireless connection, or a combination thereof.

16. An apparatus for wireless communication at a second user equipment (UE), comprising:
    a processor;
    memory coupled with the processor; and
    instructions stored in the memory and executable by the processor to cause the apparatus to:
        transmit, to a first UE, link capability information associated with a subscription of the second UE to a cellular wireless network, the second UE having a cellular wireless connection with a network entity of the cellular wireless network;
        establish a local wireless connection with the first UE based at least in part on the link capability information associated with the subscription of the second UE to the cellular wireless network;
        receive, via the local wireless connection, a request for cellular capability information associated with the second UE;
        transmit, via the local wireless connection, a response indicating the cellular capability information associated with the second UE; and
        communicate one or more messages between the first UE and the network entity of the cellular wireless network using first subscriber identity module credentials of the first UE or second subscriber identity module credentials of the second UE based at least in part on establishing the local wireless connection with the first UE.

17. The apparatus of claim 16, wherein the instructions are further executable by the processor to cause the apparatus to:
    select the first UE as a remote device for the second UE based at least in part on cellular connection capabilities associated with one or more subscriber identity modules of the first UE.

18. The apparatus of claim 16, wherein the instructions are further executable by the processor to cause the apparatus to:
    transmit, via the local wireless connection, a request for a subscriber identity module profile of the first UE; and receive an indication of the subscriber identity module profile of the first UE via a subscriber identity module access profile exchange.

19. The apparatus of claim 16, wherein the instructions are further executable by the processor to cause the apparatus to:
transmit, via the local wireless connection, a request to initiate a subscriber identity module binding procedure with the cellular wireless network, wherein communicating the one or more messages between the first UE and the network entity of the cellular wireless network is based at least in part on the subscriber identity module binding procedure.

20. The apparatus of claim 19, wherein the instructions are further executable by the processor to cause the apparatus to:
transmit an indication of an embedded subscriber identity module profile of the second UE via a subscriber identity module access profile exchange, wherein the embedded subscriber identity module profile of the second UE is used to perform the subscriber identity module binding procedure with the cellular wireless network.

21. The apparatus of claim 19, wherein the instructions are further executable by the processor to cause the apparatus to:
perform a radio access technology configuration management exchange procedure to transfer an embedded subscriber identity module profile of the second UE to the first UE, wherein the embedded subscriber identity module profile of the second UE is used to perform the subscriber identity module binding procedure with the cellular wireless network.

22. The apparatus of claim 16, wherein the instructions are further executable by the processor to cause the apparatus to:
exchange subscriber identity module information with the first UE via a subscriber identity module access profile exchange;
transmit, via the local wireless connection, a request for a radio access technology configuration management device profile of the first UE; and
receive, via the local wireless connection, an indication of the radio access technology configuration management device profile of the first UE.

23. The apparatus of claim 22, wherein the instructions are further executable by the processor to cause the apparatus to:
register with the cellular wireless network using the subscriber identity module information provided by the first UE, the radio access technology configuration management device profile of the first UE, or both.

24. The apparatus of claim 22, wherein the instructions are further executable by the processor to cause the apparatus to:
establish a relay connection between the first UE and the cellular wireless network based at least in part on the radio access technology configuration management device profile of the first UE.

25. The apparatus of claim 16, wherein the instructions are further executable by the processor to cause the apparatus to:
receive one or more messages that indicate one or more device tethering capabilities, subscription capabilities, radio access technology capabilities, antenna capabilities, power capabilities, local link capabilities, over-the-air capabilities, or device loading capabilities of the first UE.

26. The apparatus of claim 16, wherein, to transmit the link capability information, the instructions are executable by the processor to cause the apparatus to:
transmit one or more messages that indicate one or more device tethering capabilities, subscription capabilities, radio access technology capabilities, antenna capabilities, power capabilities, local link capabilities, over-the-air capabilities, or device loading capabilities of the second UE.

27. A method for wireless communication at a first user equipment (UE), comprising:
receiving, from a second UE that has a cellular wireless connection with a network entity of a cellular wireless network, link capability information associated with a subscription of the second UE to the cellular wireless network;
establishing a local wireless connection with the second UE based at least in part on the link capability information associated with the subscription of the second UE to the cellular wireless network;
transmitting, via the local wireless connection, a request for cellular capability information associated with the second UE;
receiving, via the local wireless connection, a response indicating the cellular capability information associated with the second UE; and
communicating one or more messages with the network entity of the cellular wireless network via the second UE using first subscriber identity module credentials of the first UE or second subscriber identity module credentials of the second UE based at least in part on establishing the local wireless connection with the second UE.

28. A method for wireless communication at a second user equipment (UE), comprising:
transmitting, to a first UE, link capability information associated with a subscription of the second UE to a cellular wireless network, the second UE having a cellular wireless connection with a network entity of the cellular wireless network;
establishing a local wireless connection with the first UE based at least in part on the link capability information associated with the subscription of the second UE to the cellular wireless network;
receiving, via the local wireless connection, a request for cellular capability information associated with the second UE;
transmitting, via the local wireless connection, a response indicating the cellular capability information associated with the second UE; and
communicating one or more messages between the first UE and the network entity of the cellular wireless network using first subscriber identity module credentials of the first UE or second subscriber identity module credentials of the second UE based at least in part on establishing the local wireless connection with the first UE.

* * * * *